United States Patent
Takahashi et al.

(10) Patent No.: US 11,057,686 B2
(45) Date of Patent: Jul. 6, 2021

(54) TRANSMISSION DEVICE, TRANSMISSION METHOD, RECEPTION DEVICE, AND RECEPTION METHOD

(71) Applicant: Saturn Licensing LLC, New York, NY (US)

(72) Inventors: Kazuyuki Takahashi, Chiba (JP); Lachlan Bruce Michael, Saitama (JP)

(73) Assignee: Saturn Licensing LLC, New York, NY (US)

( * ) Notice: Subject to any disclaimer, the term of this patent is extended or adjusted under 35 U.S.C. 154(b) by 0 days.

(21) Appl. No.: 16/588,191

(22) Filed: Sep. 30, 2019

(65) Prior Publication Data
US 2020/0029132 A1 Jan. 23, 2020

Related U.S. Application Data

(63) Continuation of application No. 15/554,016, filed as application No. PCT/JP2016/002449 on May 19, 2016, now Pat. No. 10,484,759.

(30) Foreign Application Priority Data

Jun. 2, 2015 (JP) .................................. 2015-112212

(51) Int. Cl.
*H04N 21/8547* (2011.01)
*H04N 21/43* (2011.01)
(Continued)

(52) U.S. Cl.
CPC ........ *H04N 21/8547* (2013.01); *H04H 60/40* (2013.01); *H04N 21/4305* (2013.01);
(Continued)

(58) Field of Classification Search
CPC .................................................. H04N 21/8547
See application file for complete search history.

(56) References Cited

U.S. PATENT DOCUMENTS

2011/0150005 A1* 6/2011 Chen ..................... H04J 3/0667
370/503
2012/0188878 A1 7/2012 Simon
(Continued)

FOREIGN PATENT DOCUMENTS

JP H10-28116 A 1/1998
JP 2003-052017 A 2/2003
(Continued)

OTHER PUBLICATIONS

"Digital Video Broadcasting (DVB): Frame structure channel coding and modulation for a second generation digital terrestrial television broadcasting system (DVB-T2)," ETSI EN 302 755 V1.3.1, XP055273203, Apr. 1, 2012, (188 pages).
(Continued)

*Primary Examiner* — Michael H Hong
(74) *Attorney, Agent, or Firm* — Oblon, McClelland, Maier & Neustadt, L.L.P.

(57) ABSTRACT

There is provided a transmission device including circuitry configured to generate a physical layer frame. A time information descriptor is included in a preamble of the physical layer frame. The time information descriptor includes a time information flag that indicates presence or absence of time information in the time information descriptor. The circuitry is configured to transmit the physical layer frame including the preamble and a payload. The time information indicates a time of a predetermined position in a stream of the physical layer frame.

22 Claims, 22 Drawing Sheets

(51) Int. Cl.
  *H04N 21/61* (2011.01)
  *H04N 21/643* (2011.01)
  *H04H 60/40* (2008.01)

(52) U.S. Cl.
  CPC ..... *H04N 21/6112* (2013.01); *H04N 21/6118* (2013.01); *H04N 21/6143* (2013.01); *H04N 21/64322* (2013.01)

(56) References Cited

U.S. PATENT DOCUMENTS

| | | | |
|---|---|---|---|
| 2015/0010018 A1* | 1/2015 | Yang | H04H 20/72 |
| | | | 370/474 |
| 2015/0373380 A1 | 12/2015 | Tsukagoshi | |
| 2016/0345329 A1 | 11/2016 | Myung | |
| 2017/0111692 A1 | 4/2017 | An et al. | |

FOREIGN PATENT DOCUMENTS

| | | |
|---|---|---|
| JP | 2010-219767 A | 9/2010 |
| JP | 2012-039503 A | 2/2012 |
| JP | 2014-200054 A | 10/2014 |
| WO | 2014/142203 A1 | 9/2014 |

OTHER PUBLICATIONS

"Transmission System for Advance Wide Band Digital Satellite Broadcasting, ARIB Standard," ARIB STD-B44 Version 2.0, Association of Radio Industries and Businesses, Jul. 31, 2014, (134 pages).

International Search Report dated Jul. 29, 2016 in PCT/JP2016/002449 filed May 19, 2016.

Office Action issued in corresponding Japanese Application No. 2015-112212 dated May 30, 2019, 4 pages.

Digital Video Broadcasting (DVB), Frame structure channel coding and modulation for a second generation digital terrestrial television broadcasting system (DVB-T2), ETSI EN 302 755, V1.1.1, Sep. 2009.

Office Action issued in corresponding Japanese Application No. 2015-112212 dated Aug. 22, 2019.

Office Action dated Aug. 22, 2019 in corresponding Japanese Patent Application No. 2015-112212 (English Translation only), 4 pages.

* cited by examiner

[Fig. 1]
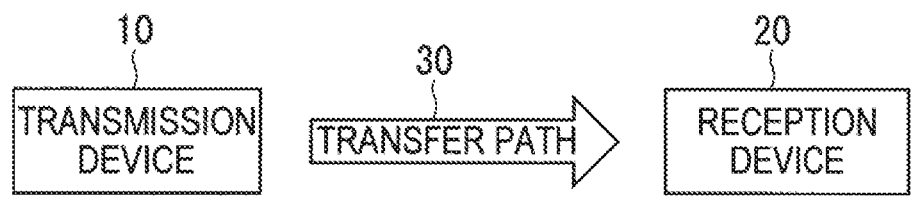

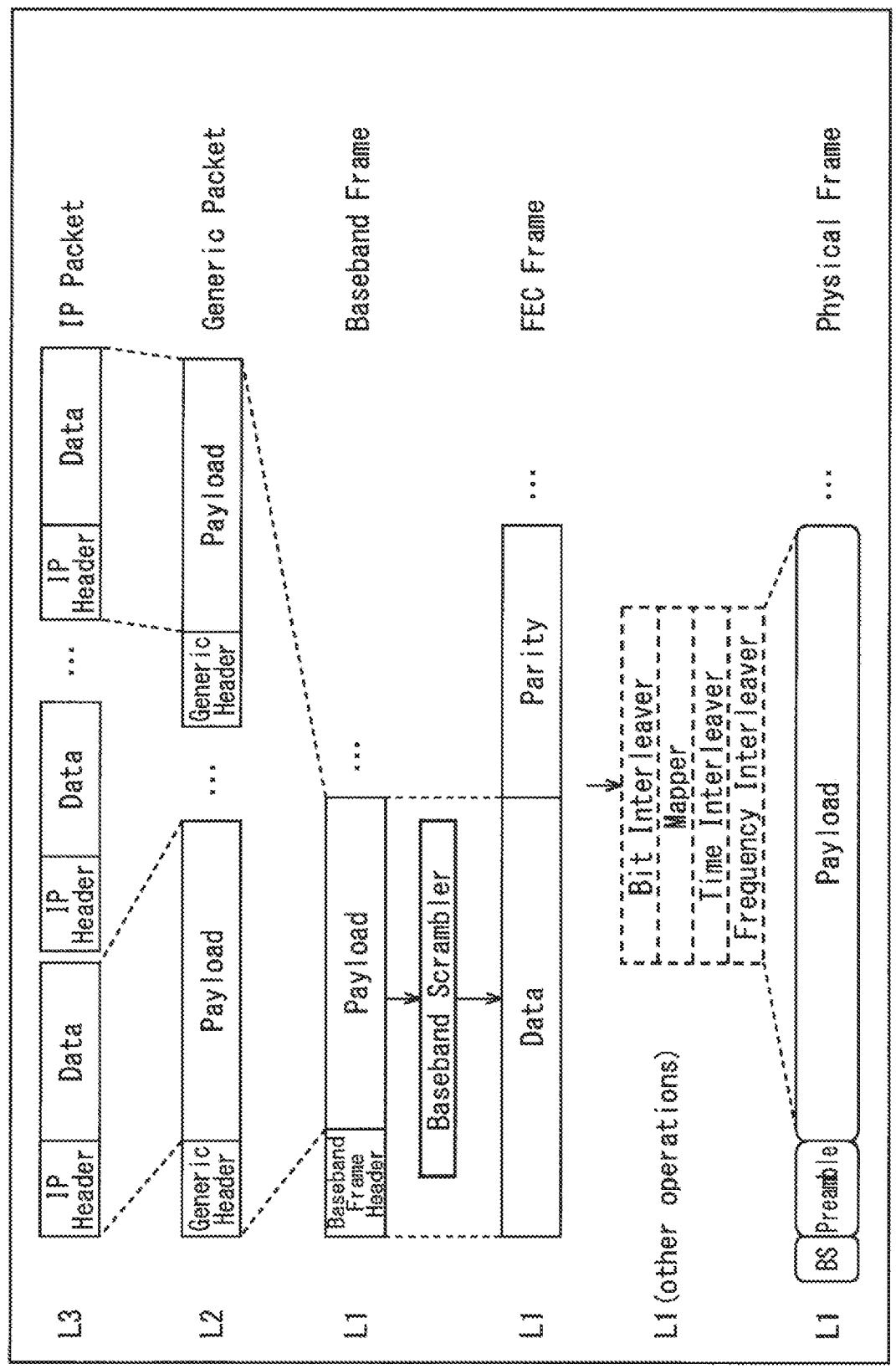
[Fig. 2]

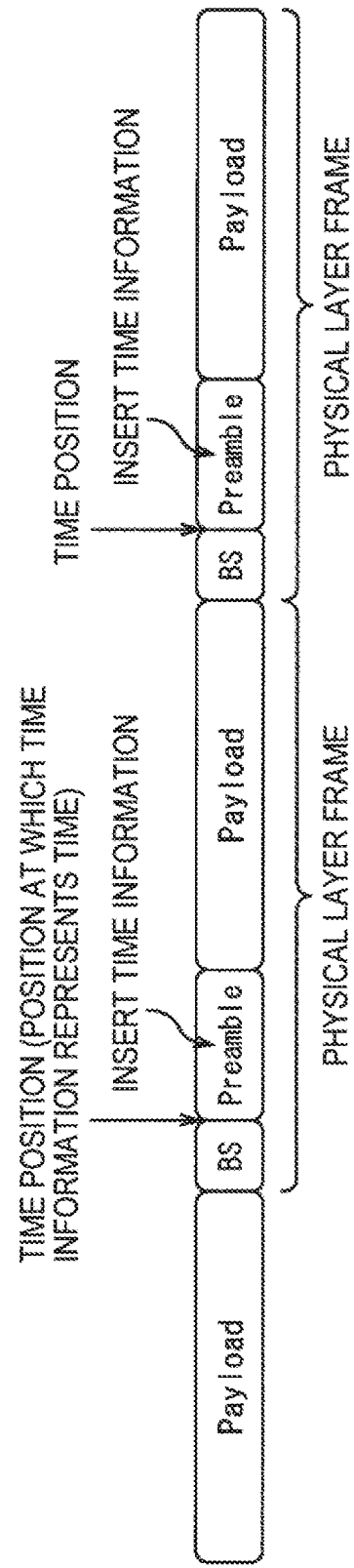

[Fig. 4]
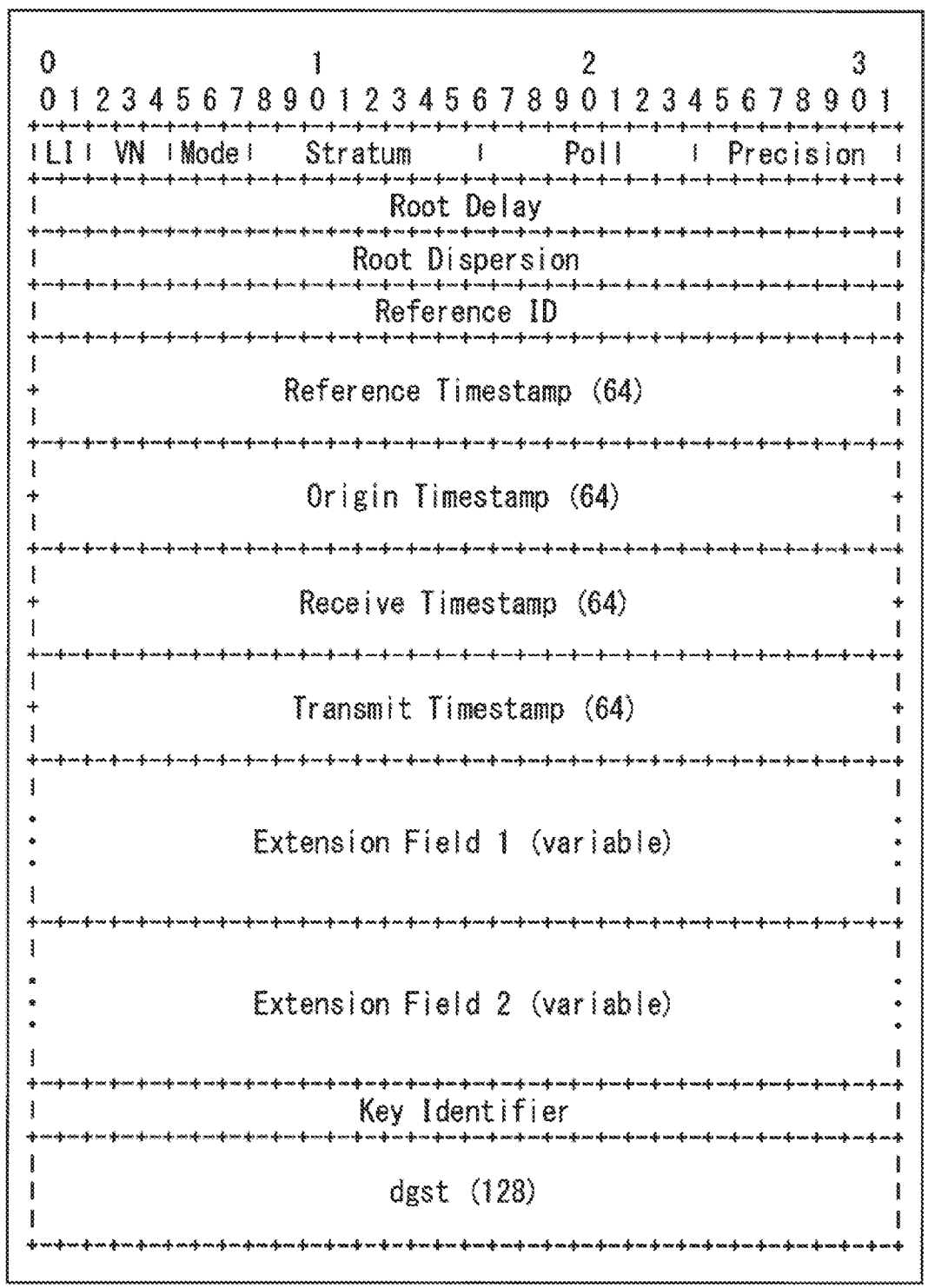

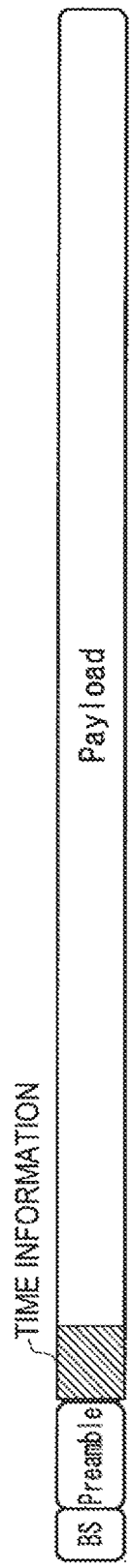
[Fig. 5]

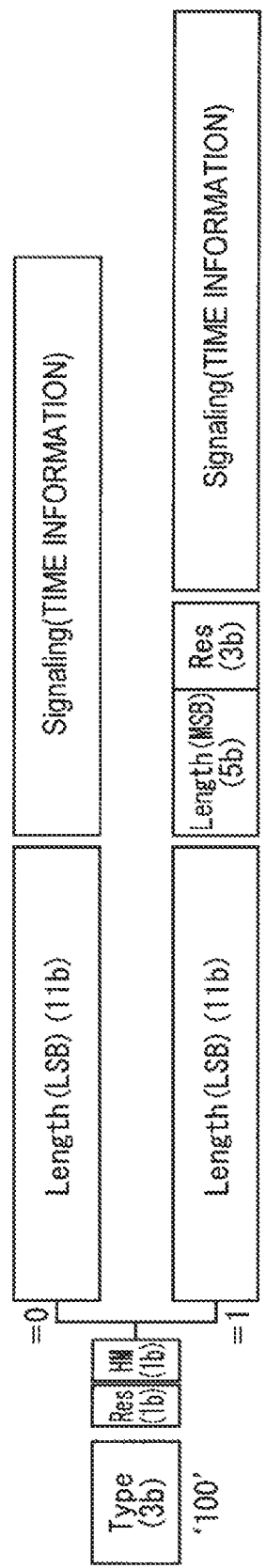

[Fig. 7]

| Packet Type Value | Meaning |
|---|---|
| 000 | IPv4 |
| 001 | Compressed IP Packet |
| 010 | MPEG-2 Transport Stream |
| 011 | Reserved |
| 100 | Signaling |
| 101 | Reserved |
| 110 | Reserved |
| 111 | Extension |

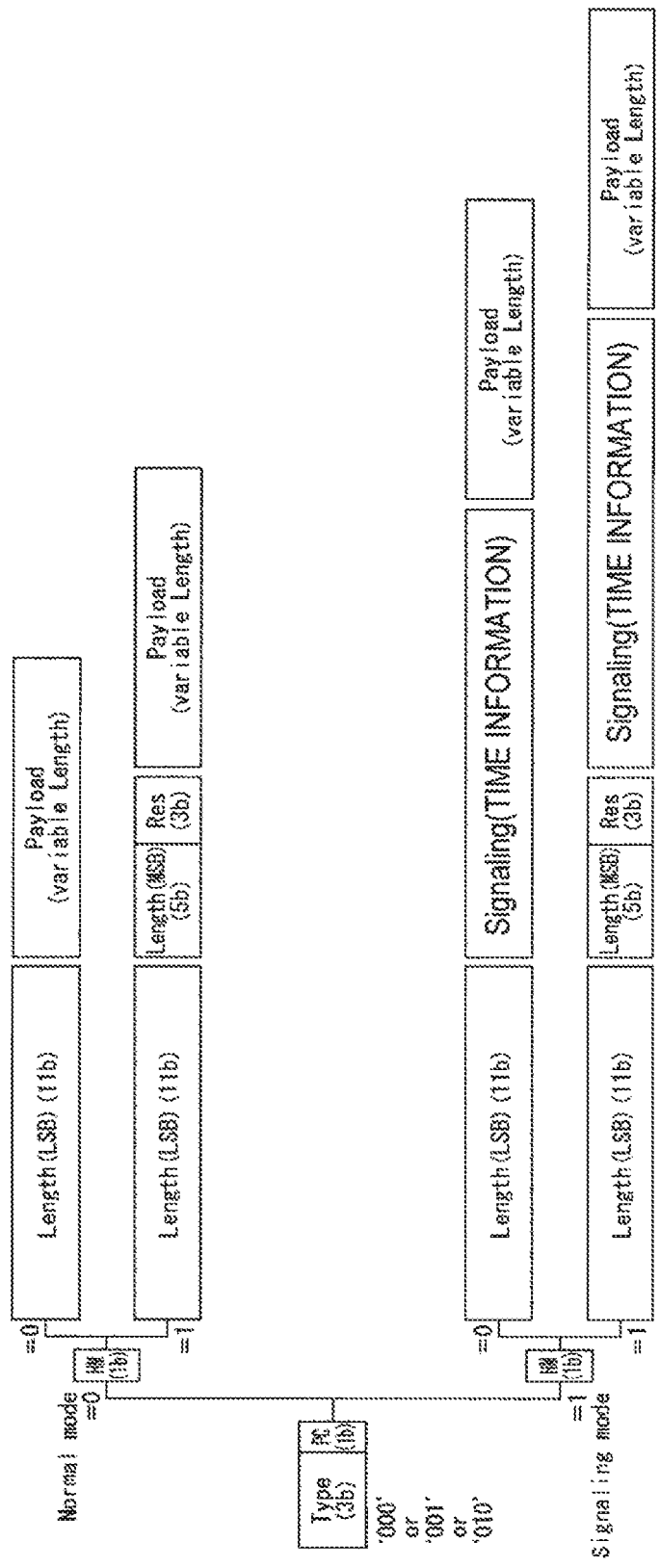

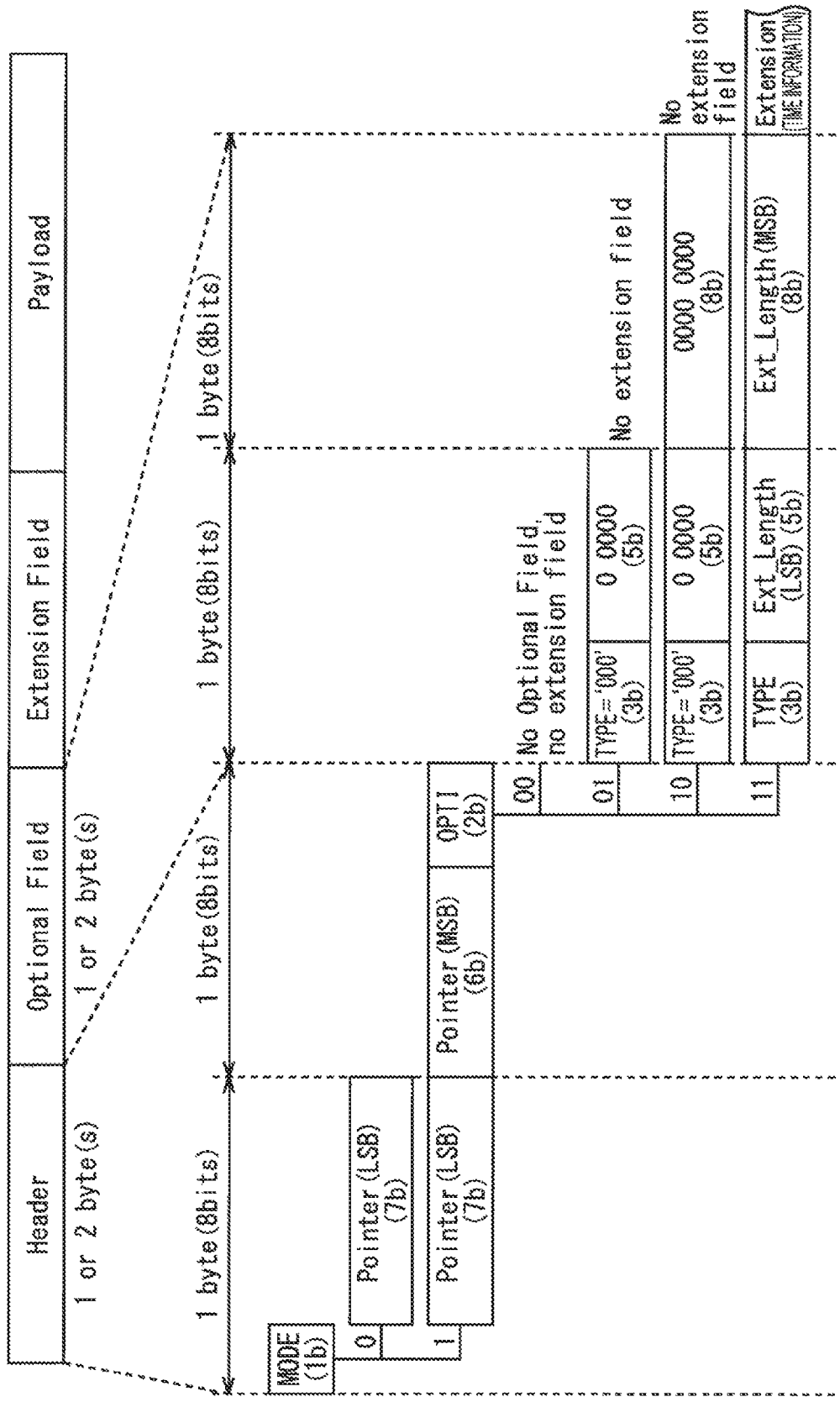
[Fig. 9]

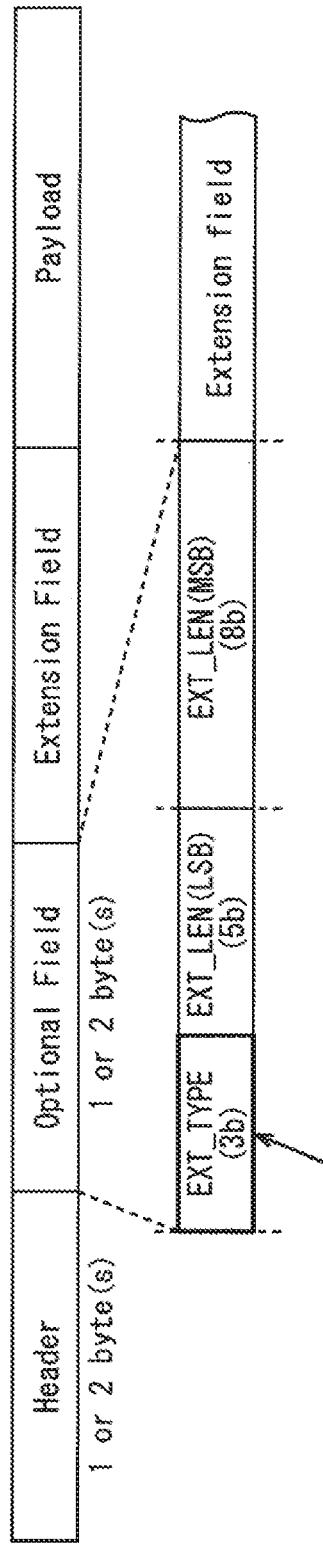
[Fig. 10]

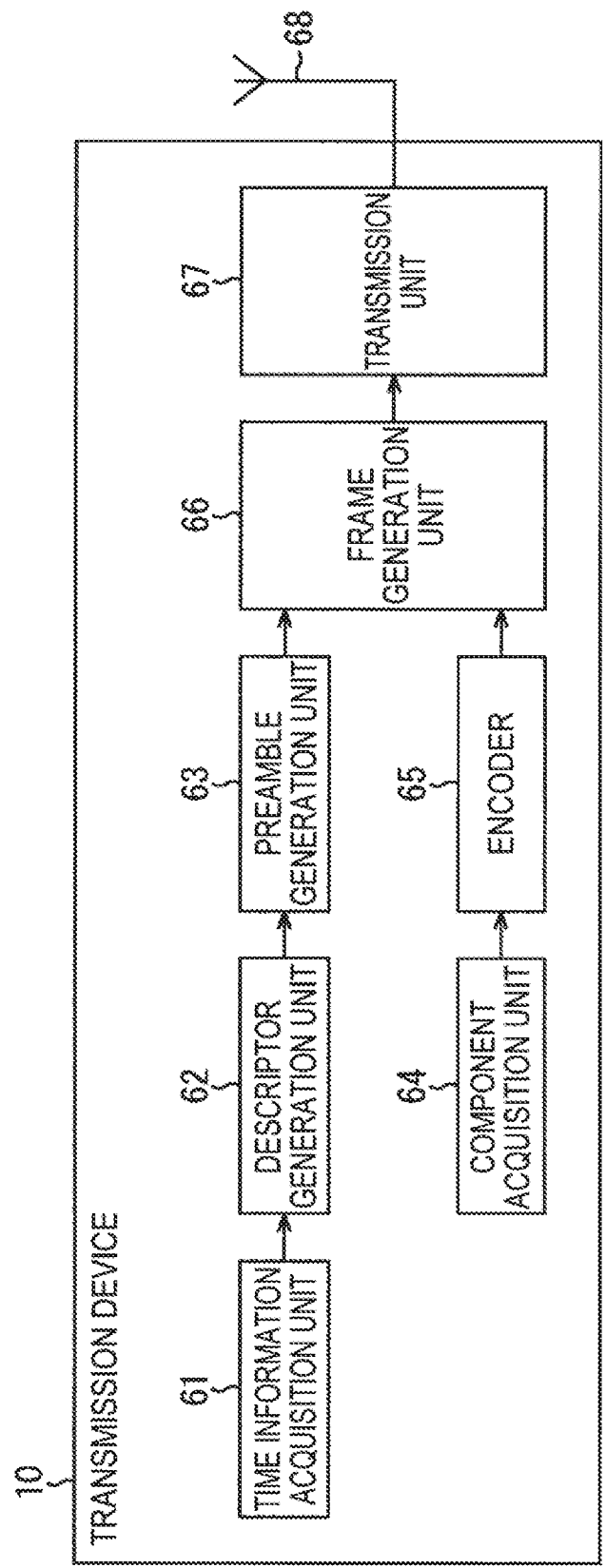
[Fig. 11]

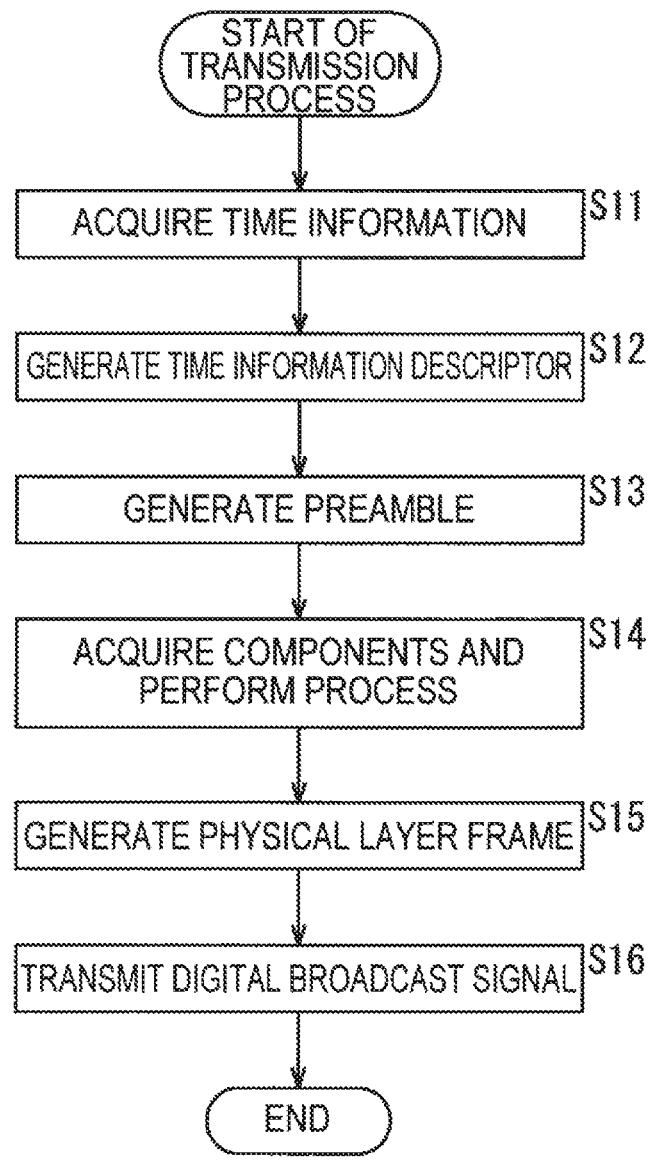

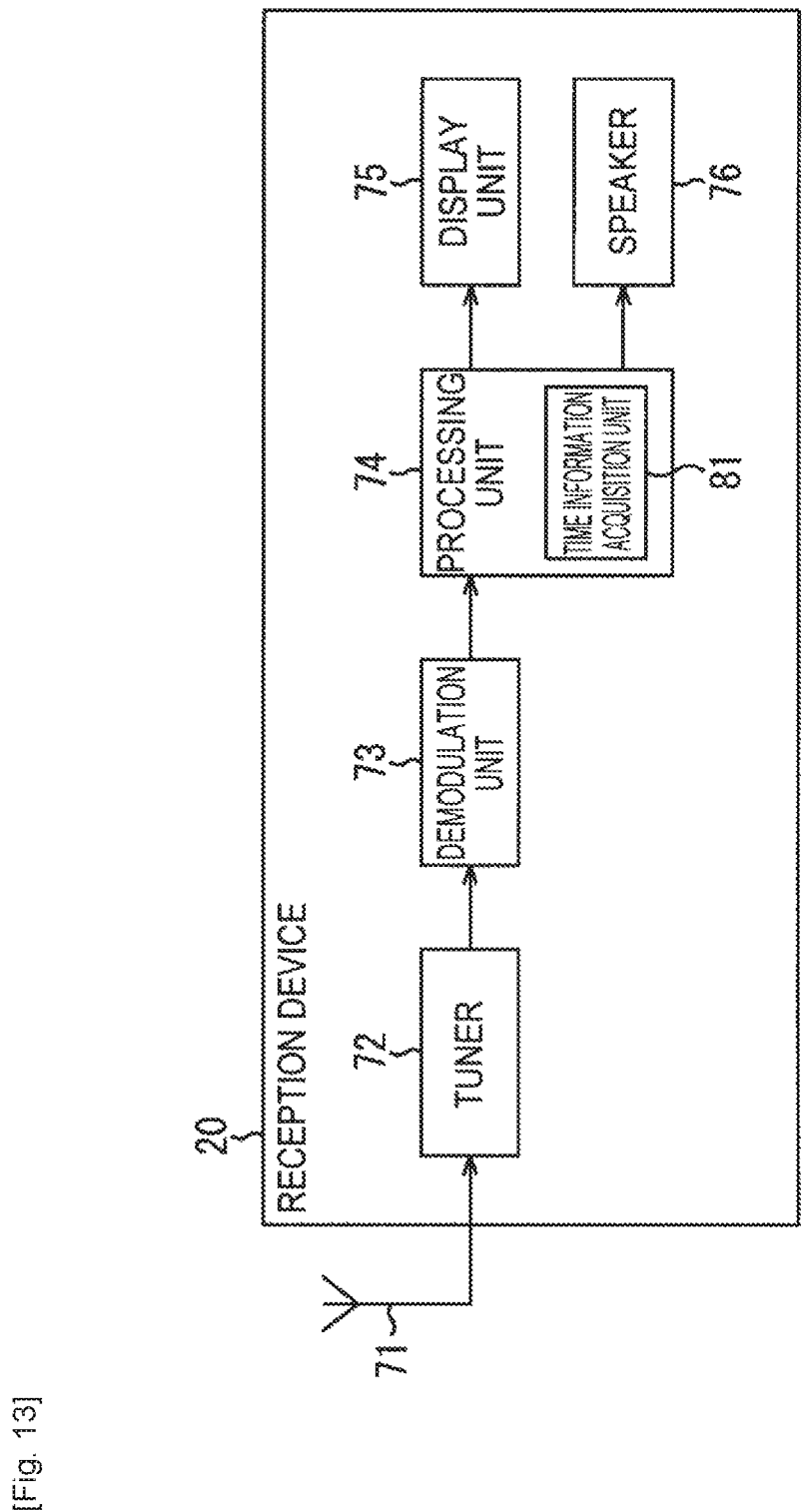
[Fig. 13]

[Fig. 14]
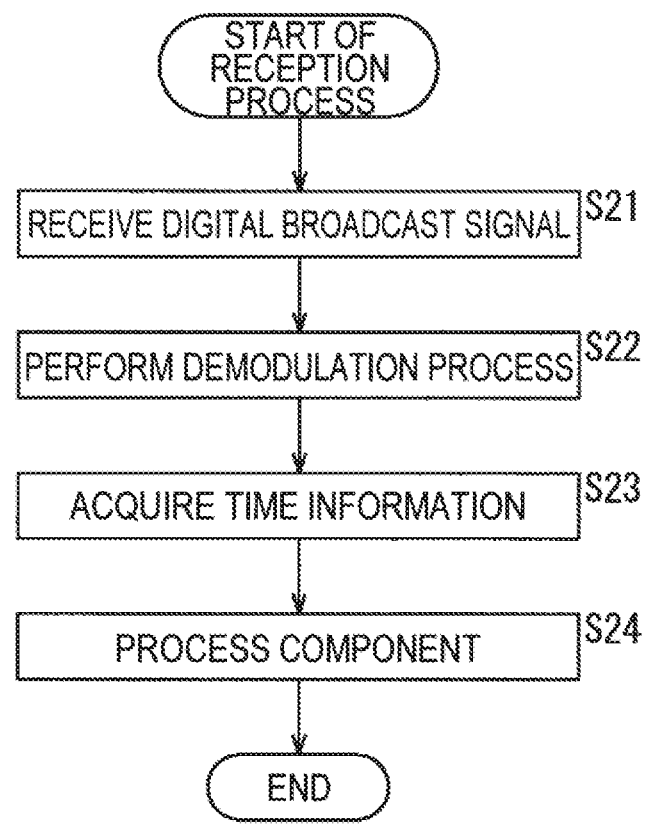

[Fig. 15]

5.3.3 Timestamp

The Timestamp type represents a positive time with respect to the epoch.

struct Timestamp
{
    UInteger48 secondsField;
    UInteger32 nanosecondsField;
};

The secondsField member is the integer portion of the timestamp in units of seconds.

The nanosecondsField member is the fractional portion of the timestamp in units of nanoseconds.

The nanosecondsField member is always less than $10^9$.

For example:

+2.000000001 seconds is represented by secondsField=0000 0000 0002$_{16}$ and nanosecondsField=0000 0001$_{16}$.

7.2.2 Epoch

The epoch is the origin of the timescale of a domain.

The PTP epoch is 1 January 1970 00:00:00 TAI, which is 31 December 1969 23:59:51.999918 UTC.

NOTE 1—The PTP epoch coincides with the epoch of the common Portable Operating System Interface (POSIX) algorithms for converting elapsed seconds since the epoch to the ISO 8601:2004 printed representation of time of day; see ISO/IEC 9945:2003[B16] and ISO 8601:2004[B17].

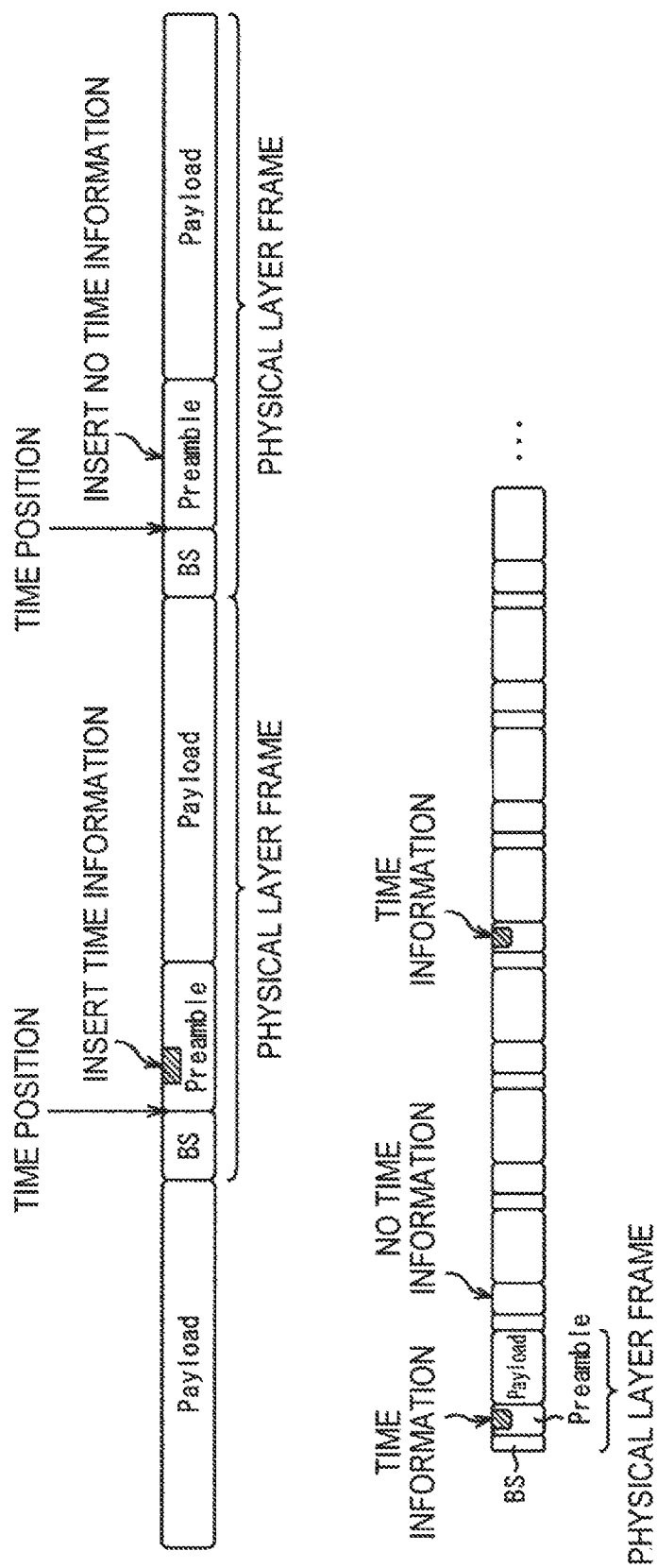

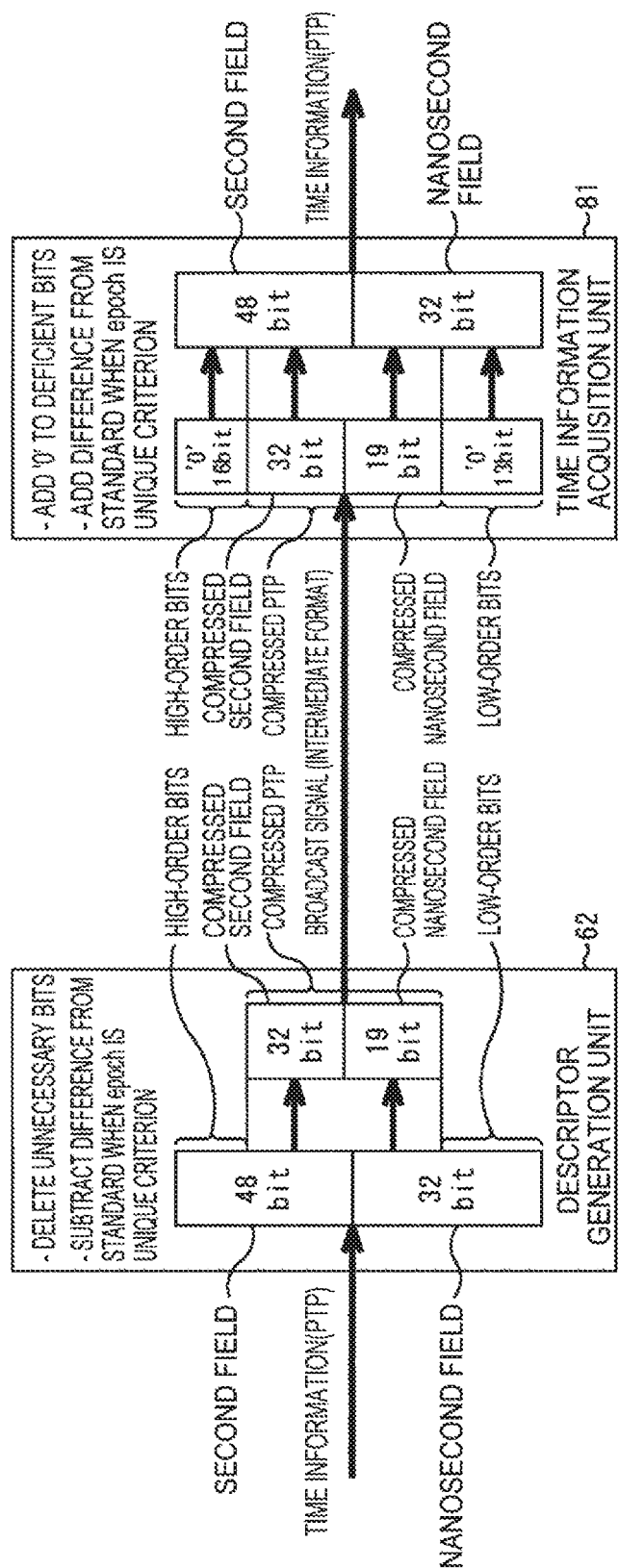
[Fig. 17]

[Fig. 18]

| Mode | INTERMEDIATE FORMAT (COMPRESSED PTP) | Epoch |
|---|---|---|
| 0 | 48bit+32bit | STANDARD (1 JANUARY, 1970) |
| 1 | 32bit+19bit | STANDARD (1 JANUARY, 1970) |
| 2 | 32bit+27bit | STANDARD (1 JANUARY, 1970) |
| 3 | Reserved | Reserved |
| 4 | 48bit+32bit | UNIQUE (1 JANUARY, 2016) |
| 5 | 31bit+19bit | UNIQUE (1 JANUARY, 2016) |
| 6 | 31bit+27bit | UNIQUE (1 JANUARY, 2016) |
| 7 | Reserved | Reserved |
| ... | ... | ... |
| 15 | Reserved | Reserved |

[Fig. 19]

| Syntax | No of bits | Semantics |
|---|---|---|
| time_info_flag | 1 | FLAG INDICATING THAT TIME INFORMATION IS PRESENT |
| if (tme_info_flag == 1) { | | |
| PTP_secondsField | 32 | SECOND FIELD |
| PTP_nanosecondsField | 19 | NANOSECOND FIELD |
| } | | |

[Fig. 20]

| Syntax | No of bits | Semantics |
|---|---|---|
| time_info_flag | 1 | FLAG INDICATING THAT TIME INFORMATION IS PRESENT |
| if(time_info_flag == 1) { | | |
| mode | 4 | TIME INFORMATION COMPRESSION MODE |
| if(mode == 0 \|\| mode == 4) { | | |
| PTP_secondsField | 48 | SECOND FIELD |
| PTP_nanosecondsField | 32 | NANOSECOND FIELD |
| } else if (mode == 1) { | | |
| PTP_secondsField | 32 | SECOND FIELD |
| PTP_nanosecondsField | 19 | NANOSECOND FIELD |
| } else if (mode == 2) { | | |
| PTP_secondsField | 32 | SECOND FIELD |
| PTP_nanosecondsField | 27 | NANOSECOND FIELD |
| } else if (mode == 5) { | | |
| PTP_secondsField | 31 | SECOND FIELD |
| PTP_nanosecondsField | 19 | NANOSECOND FIELD |
| } else if (mode == 6 ) { | | |
| PTP_secondsField | 31 | SECOND FIELD |
| PTP_nanosecondsField | 27 | NANOSECOND FIELD |
| } | | |
| } | | |

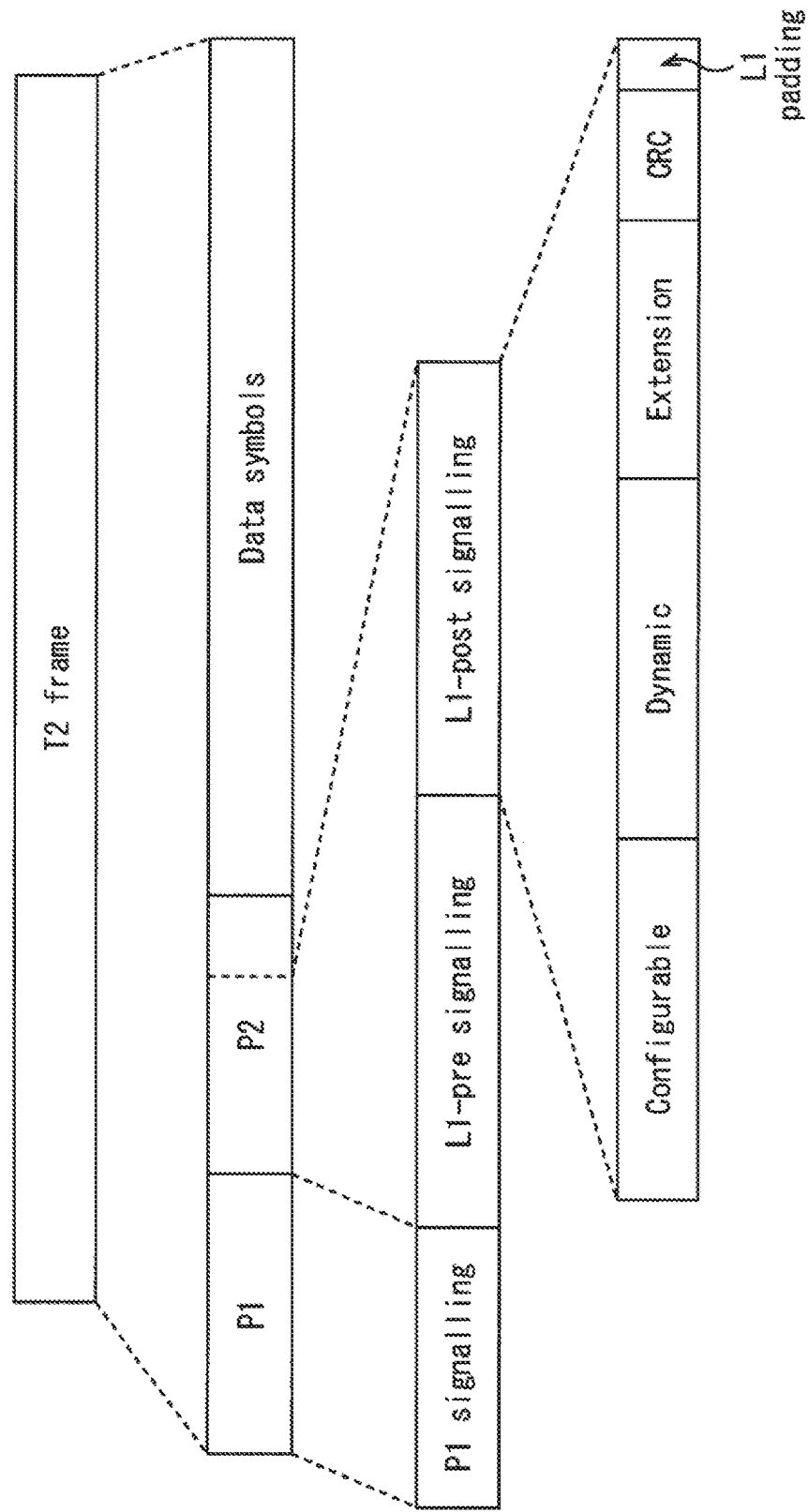
[Fig. 21]

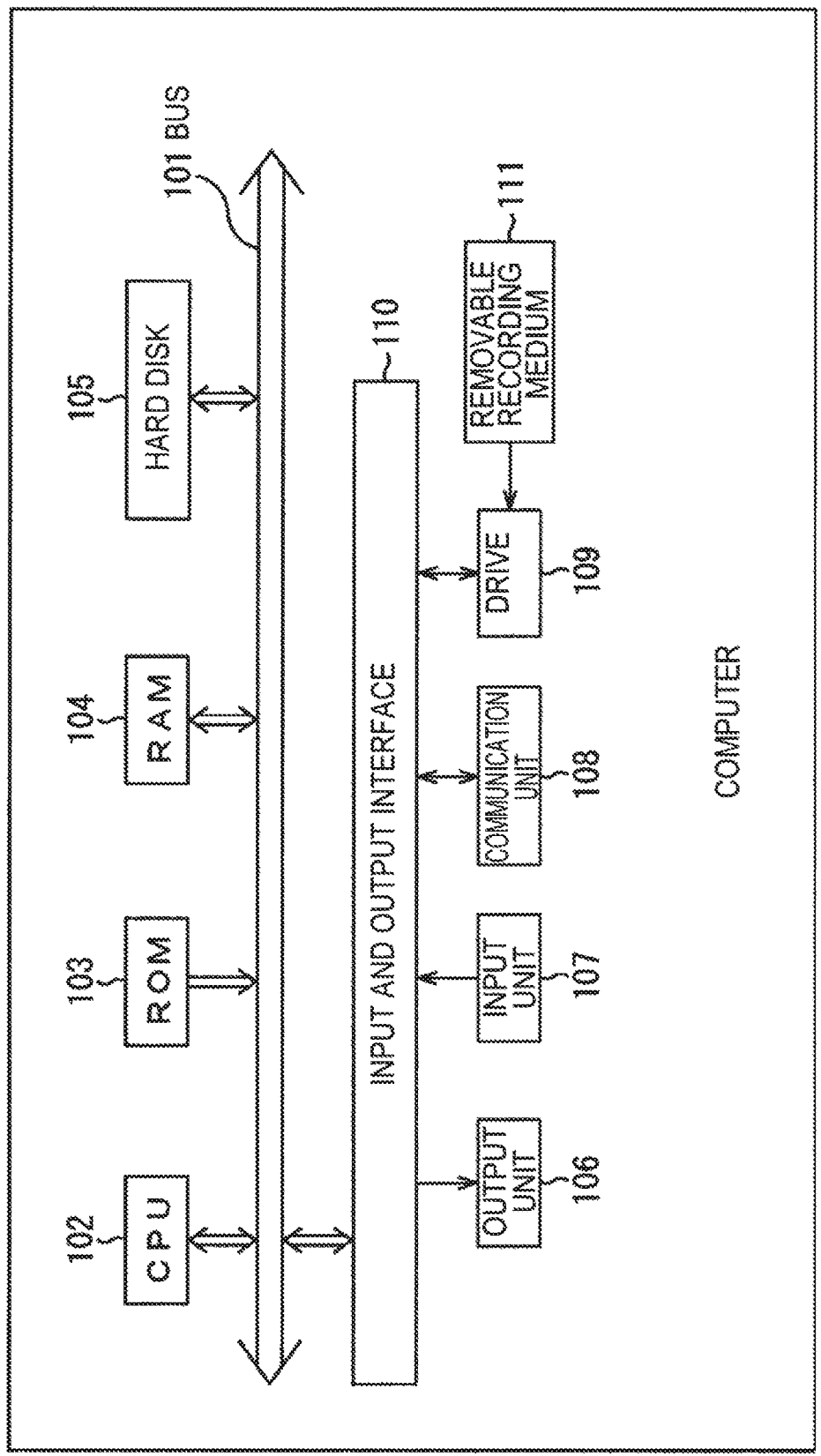

TRANSMISSION DEVICE, TRANSMISSION METHOD, RECEPTION DEVICE, AND RECEPTION METHOD

CROSS REFERENCE TO RELATED APPLICATIONS

This application is a continuation of U.S. application Ser. No. 15/554,016, filed Aug. 28, 2017, which is a U.S. National Phase Application of International Application No. PCT/JP2016/002449, filed May 19, 2016, which claims the benefit of Japanese Application No. 2015-112212, filed Jun. 2, 2015, the entire contents of each of which are incorporated herein by reference.

TECHNICAL FIELD

The present technology relates to a transmission device, a transmission method, a reception device, and a reception method, and particularly, to a transmission device, a transmission method, a reception device, and a reception method capable of efficiently transferring time information.

BACKGROUND ART

For example, in Advanced Television Systems Committee (ATSC) 3.0 which is one of the next-generation terrestrial broadcast standards, not Transport Stream (TS) packets but User Datagram Protocol (UDP)/Internet Protocol (IP), that is, IP packets including UPD packets, are mainly decided to be used for data transfer. In the future, IP packets are expected to be used in broadcast schemes other than ATSC 3.0.

When TS is broadcast, a program clock reference (PCR) is transferred as time information for synchronization between a transmission side and a reception side (for example, see NPL 1).

CITATION LIST

Non Patent Literature

[NPL 1]
"ARIB STD-B44 2.0 Edition," Association of Radio Industries and Businesses

SUMMARY

Technical Problem

In broadcast schemes such as ATSC 3.0, time information is requested to be efficiently transferred when the time information for synchronization between a transmission side and a reception side is transferred.

In the present technology, it is desirable to efficiently transfer time information.

Solution to Problem

According to an embodiment of the present disclosure, there is provided a transmission device including circuitry configured to generate a physical layer frame. A time information descriptor is included in a preamble of the physical layer frame. The time information descriptor includes a time information flag that indicates presence or absence of time information in the time information descriptor. The circuitry is configured to transmit the physical layer frame including the preamble and a payload. The time information indicates a time of a predetermined position in a stream of the physical layer frame.

According to an embodiment of the present disclosure, there is provided a method of a transmission device for transmitting a physical layer frame. The method includes generating, by circuitry of the transmission device, the physical layer frame. A time information descriptor is included in a preamble of the physical layer frame. The time information descriptor includes a time information flag that indicates presence or absence of time information in the time information descriptor. The method includes transmitting, by the circuitry, the physical layer frame including the preamble and a payload. The time information indicates a time of a predetermined position in a stream of the physical layer frame.

According to an embodiment of the present disclosure, there is provided a reception device including circuitry configured to receive a physical layer frame. A time information descriptor is included in a preamble of the physical layer frame. The time information descriptor includes a time information flag that indicates presence or absence of time information in the time information descriptor. The circuitry is configured to perform a process based on the time information when the time information is included in the time information descriptor. The time information indicates a time of a predetermined position in a stream of the physical layer frame including the preamble and a payload.

According to an embodiment of the present disclosure, there is provided a method of a reception device for receiving a physical layer frame. The method includes receiving, by circuitry of the reception device, the physical layer frame, a time information descriptor is included in a preamble of the physical layer frame. The time information descriptor includes a time information flag that indicates presence or absence of time information in the time information descriptor. The method includes performing a process based on the time information when the time information is included in the time information descriptor. The time information indicates a time of a predetermined position in a stream of the physical layer frame including the preamble and a payload.

The transmission device or the reception device may be an independent device or an internal block included in one device.

Advantageous Effects of Invention

According to an embodiment of the present technology, it is possible to efficiently transfer time information.

Note that the effects described above are not necessarily limited, and along with or instead of the effects, any effect that is desired to be introduced in the present specification or other effects that can be expected from the present specification may be exhibited.

BRIEF DESCRIPTION OF DRAWINGS

FIG. 1 is a block diagram illustrating a configuration example of an embodiment of a transfer system to which an embodiment of the present technology is applied.

FIG. 2 is a diagram illustrating an example of a protocol stack of broadcast performed in the transfer system.

FIG. 3 is a diagram for describing time information.

FIG. 4 is a diagram illustrating the format of an NTP packet.

FIG. 5 is a diagram for describing an example of an arrangement position of the time information.

FIG. 6 is a diagram for describing a first arrangement example when the time information is arranged in the head of a payload of a physical layer frame.

FIG. 7 is a diagram for describing type information of a generic packet.

FIG. 8 is a diagram for describing a second arrangement example when the time information is arranged in the head of the payload of the physical layer frame.

FIG. 9 is a diagram for describing a third arrangement example when the time information is arranged in the head of the payload of the physical layer frame.

FIG. 10 is a diagram for describing extension type information (EXT_TYPE).

FIG. 11 is a block diagram illustrating a configuration example of a transmission device 10.

FIG. 12 is a flowchart for describing an example of a transmission process performed by the transmission device 10.

FIG. 13 is a block diagram illustrating a configuration example of a reception device 20.

FIG. 14 is a flowchart for describing a reception process performed by the reception device 20.

FIG. 15 is a diagram for describing time information which is defined in the PTP and can be used as the time information.

FIG. 16 is a diagram for describing an example of a method of reducing a transfer frequency of the PTP.

FIG. 17 is a diagram for describing an example of a method of compressing the PTP.

FIG. 18 is a diagram illustrating an example of a compression mode in which the PTP is compressed.

FIG. 19 is a diagram illustrating a first example of the syntax of a time information descriptor.

FIG. 20 is a diagram illustrating a second example of the syntax of the time information descriptor.

FIG. 21 is a diagram illustrating the configuration of a T2 frame (T2frame) which is a physical layer frame of DVB-T.2.

FIG. 22 is a block diagram illustrating a configuration example of an embodiment of a computer to which an embodiment of the present technology is applied.

DESCRIPTION OF EMBODIMENTS

<Transfer System in Embodiment to which the Present Technology is Applied>

FIG. 1 is a block diagram illustrating a configuration example of an embodiment of a transfer system to which the present technology is applied.

In FIG. 1, the transfer system is configured to include a transmission device 10 and a reception device 20.

The transmission device 10 performs, for example, transmission of a service such as a program. That is, the transmission device 10 transmits (transfers) a stream of target data, which is a transmission target such as image or audio data serving as a component included in a service such as a program (television broadcast program), as a digital broadcast signal via a transfer path 30.

The reception device 20 receives the digital broadcast signal transmitted from the transmission device 10 via the transfer path 30, restores the digital broadcast signal to the original stream, and outputs the original stream. For example, the reception device 20 outputs the image or audio data serving as the component included in the service such as a program.

The transfer system in FIG. 1 can be applied to data transfer which conforms to Advanced Television Systems Committee Standard (ATSC), Digital Video Broadcasting (DVB), Integrated Services Digital Broadcasting (ISDB) or other data transfer. As the transfer path 30, a ground wave, a satellite channel, a cable television network (wired circuit), or the like can be adopted.

<Protocol Stack>

FIG. 2 is a diagram illustrating an example of a protocol stack of broadcast performed in the transfer system in FIG. 1.

That is, FIG. 2 illustrates a data structure of data (a packet and a frame) handled in the transfer system in FIG. 1.

In the transfer system, data of a first layer (the physical layer) L1, data of a second layer (the data link layer) L2, and data of a third layer (the network layer) L3 of the Open Systems Interconnection (OSI) reference model are handled.

In FIG. 2, an IP packet (IP Packet) is the data of the third layer L3, a generic packet (Generic Packet) is the data of the second layer L2, and a BB frame (Baseband Frame), an FEC frame (FEC Frame), and a physical layer frame (Physical Frame) are the data of the first layer L1.

In the transfer system in FIG. 1, data broadcast is performed using IP packets.

The IP packet is configured to include an IP header (IP Header) and data (Data). For example, image or audio data is arranged in the data of the IP packet.

In the transmission device 10, a generic packet is configured (generated) from the IP packet.

The generic packet is configured to include a generic header (Generic Header) and a payload (Payload). One IP packet or a plurality of IP packets are arranged in the payload of the generic packet.

In the transmission device 10, the BB frame is configured from the generic packet.

The BB frame is configured to include a BB header (Baseband Frame Header) and a payload (Payload). One or a plurality of generic packets are arranged in the payload of the BB frame.

In the transmission device 10, the BB frame is scrambled in units of one BB frame or a plurality of BB frames, as necessary, and a parity for error correction of the physical layer is appended to the BB frame to configure an FEC frame.

Further, in the transmission device 10, a process for the physical layer, such as bit interleaving, mapping to a signal point on a constellation, or interleaving in a time direction or a frequency direction, is performed on the FEC frame in units of one FEC frame or a plurality of FEC frames, as necessary. Then, in the transmission device 10, a preamble is appended to the FEC frame after the process for the physical layer to configure a physical layer frame.

That is, the physical layer frame is configured to include the preamble (BS) and the payload (Payload). The FEC frame is arranged in the payload of the physical layer frame.

In FIG. 2, for example, the physical layer frame has a "bootstrap (BS)" and "Preamble" as the preamble as in the ATSC frame of ATSC 3.0.

Here, "BS" is also referred to as a first preamble BS and "Preamble" is also referred to as a second preamble Preamble.

The first preamble BS corresponds to, for example, a P1 symbol included in a T2 frame of DVB-T.2 and the second preamble Preamble corresponds to, for example, a P2 symbol included in the T2 frame.

The payload of the physical layer frame corresponds to, for example, a data symbol included in the T2 frame.

The physical layer frame structure used in DVB-T2 or ATSC 3.0 is configured to have a length of, for example, about 100 ms to about 200 ms. For the physical layer frame, the subsequent payload can be processed after the preamble is processed.

That is, the reception device 20 receives the physical layer frame and demodulates the preamble of the physical layer frame. Further, the reception device 20 processes the payload of the physical layer frame using the preamble of the physical layer frame to restore the FEC frame, the BB frame, the generic packet, and the IP packet in this order from the physical layer frame.

In the process for the payload of the physical layer frame, the preamble of the physical layer frame is necessary. Therefore, when reception from the middle of the physical layer frame starts in the reception device 20, the data received after the start of the reception and before the preamble subsequently appears is discarded.

<Time Information>

FIG. 3 is a diagram for describing time information.

In the transfer system in FIG. 1, as described with reference to FIG. 2, the physical layer frame is configured from the IP packet in the transmission device 10 and a stream of the physical layer frame is transmitted to the reception device 20.

Time information such as a PCR of the TS is not transmitted in the IP packet. Therefore, for synchronization between the transmission device 10 and the reception device 20, time information is preferably included in the stream of the physical layer frame.

Accordingly, the transmission device 10 can include time information in the stream of the physical layer frame.

As illustrated in FIG. 3, the time information can be included in the preamble of the physical layer frame.

Here, for example, in ATSC 3.0, about 30 bits to about 40 bits are assumed as the first preamble BS of the preamble of the physical layer frame. Accordingly, the first preamble BS may not have a sufficient number of bits to include the time information.

Accordingly, the time information can be included in the second preamble Preamble of the preamble of the physical layer frame.

The time information represents an absolute time of a predetermined position in the stream of the physical layer frame. A time of the predetermined position in the stream refers to a time of a predetermined timing while a bit at the predetermined position is processed by the transmission device 10. As the time of the predetermined timing while the bit at the predetermined position is processed by the transmission device 10, for example, there is a time of a timing when the bit at the predetermined position is output from a certain block of the transmission device 10 or a time of a timing at which the bit at the predetermined position is processed by a certain block of the transmission device 10.

Here, the predetermined position in the stream of the physical layer frame at which the time information represents the time is assumed to be a time position.

As the time position, for example, the position of the head of the physical layer frame (the position of the head of the first preamble BS) which has the preamble including the time information can be adopted.

As the time position, for example, the position of a boundary between the first preamble BS and the second preamble Preamble (the position of the end of the first preamble BS) (the position of the head of the second preamble Preamble) of the physical layer frame which has the preamble including the time information can be adopted.

Further, as the time position, for example, the position of the end of the second preamble Preamble of the physical layer frame which has the preamble including the time information can be adopted.

In addition, as the time position, any position in the physical layer frame can be adopted.

In the physical layer frame, a sampling frequency of the first preamble BS can be different from a sampling frequency of a portion after the second preamble Preamble. When the sampling frequency of the first preamble BS is different from the sampling frequency of the portion after the second preamble Preamble, the first preamble BS and the portion after the second preamble Preamble are different in a time counting method. Therefore, when the position of the head of the first preamble BS is adopted as the time position, it is necessary to change the counting method in the first preamble BS and the portion after the second preamble Preamble in regard to the counting of the time using the time position as a reference. In contrast, when the position of the head of the second preamble Preamble is adopted as the time position, it is not necessary to change the counting method in regard to the counting of the time using the time position as a reference, that is, the counting of the time in the portion after the second preamble Preamble.

Accordingly, in FIG. 3, the position of the head of the second preamble Preamble (the position of the boundary between the first preamble BS and the second preamble Preamble) of the physical layer frame which has the preamble including the time information is adopted as the time position.

The preamble (the first preamble BS and the second preamble Preamble) is present at the fixed position, that is, for example, the head of each physical layer, and is necessarily processed first when the physical layer frame is processed. Accordingly, the reception device 20 can easily acquire and process the time information included in the preamble.

Since the preamble is transferred relatively robustly, the time information included in the preamble can also be transferred relatively robustly.

Here, as the time information, for example, any time information such as time information defined in the Network Time Protocol (NTP), time information defined in Third Generation Partnership Project (3GPP), time information defined in the Precise Time Protocol (PTP), the time information included in Global Positioning System (GPS) information, or other time information with a uniquely decided format can be adopted.

FIG. 4 is a diagram illustrating the format of an NTP packet.

A 2-bit leap indicator (LI) indicates that a leap second is inserted or deleted in the 1 final minute of a current month. A 3-bit version number (VN) indicates a version of the NTP. A 3-bit Mode indicates an operation mode of the NTP.

An 8-bit Stratum indicates a layer and an 8-bit Poll indicates an interval (units of seconds) of continuous NTP messages as a polling interval. An 8-bit Precision indicates precision (units of seconds) of a system clock.

A Root Delay indicates reciprocation delay up to a reference time as a root delay in the NTP short format. A Root Dispersion indicates a dispersion of a total delay up to the reference time in the NTP short format. A Reference ID indicates an identifier that represents the reference time. In a broadcast system, "0000" indicating NULL can be stored in the Reference ID.

A Reference Timestamp indicates a time at which a system time is finally corrected as a reference timestamp in the NTP long format. An Origin Timestamp indicates a time of a client at which a request is transmitted from the client to a server as a start timestamp in the NTP long format. In a broadcast system, "0" can be stored in the Origin Timestamp.

A Receive Timestamp indicates a time of the server receiving the request received from the client as a reception timestamp in an NTP long format. In a broadcast system, "0" is stored in the Receive Timestamp. A Transmit Timestamp indicates a time of the server transmitting a response to the client as a transmission timestamp in the NTP long format.

In addition, the NTP packet has an Extension Field 1 or Extension Field 2 which is an extension field and a Key Identifier or dgst (message digest), as necessary.

As the time information, 64-bit time information represented with the same format as the timestamp such as the Reference Timestamp of the NTP packet can be adopted.

Here, in the 64-bit time of the timestamp of the NTP packet, there is a problem that a time is discontinuous due to the leap second. However, the time information included in the physical layer frame has sufficient granularity.

In addition to the timestamp of the NTP packet, time information defined in 3GPP, that is, for example, timeInfo-r11 which is time information defined in 3GPP TS 36 331, can be adopted as the time information.

The timeInfo-r11 is configured to have 56 bits of a 39-bit timeInfoUTC-r11, a 2-bit dayLightSavingTime-r11, an 8-bit leapSeconds-r11, and a 7-bit localTimeOffset-r11. In the timeInfo-r11, granularity is slightly insufficient for the time information included in the physical layer frame, but the problem of the leap second does not occur.

In addition, time information defined with the PTP, that is, 80 bits representing a time defined in IEEE1588 in regard to a PTP packet can be adopted as the time information. In the 80 bits representing a time of the PTP packet, 48 bits of the 80 bits represent a time in units of seconds and the remaining 32 bits represent a time in units of nanoseconds. Accordingly, the time information defined in the PTP has sufficient granularity as the time information included in the physical layer frame, and thus can represent an accurate time. The time information preferably represents a more accurate time from the viewpoint of reproducing an accurate time in the reception device 20. When the time information defined in the PTP is adopted as the time information included in the physical layer frame, the accurate time information can be transferred and the accurate time can be reproduced in the reception device 20. Further, in the time information defined in the PTP, the problem of the leap second does not occur.

<Arrangement Position of Time Information>

FIG. 5 is a diagram for describing an example of an arrangement position of the time information.

In FIG. 3, the time information is arranged (included) in the preamble of the physical layer frame. However, the time information can be arranged in, for example, the payload of the physical layer frame other than the preamble of the physical layer frame.

In FIG. 5, the time information is arranged in a head portion of the payload of the physical layer frame.

When the time information is arranged in the head portion of the payload of the physical layer frame, the reception device 20 can acquire the time information arranged in the head of the payload after the processing of the preamble (the first preamble BS and the second preamble Preamble) of the physical layer frame.

<First Arrangement Example when Time Information is Arranged in Payload>

FIG. 6 is a diagram for describing a first arrangement example when the time information is arranged in the head of the payload of the physical layer frame.

In the first arrangement example, the time information is arranged in the payload of the generic packet in the head of the BB frame of the head of the payload of the physical layer frame as the head of the payload of the physical layer frame.

FIG. 6 illustrates a configuration example of the generic packet.

In the generic packet in FIG. 6, 3-bit type information (Type) is set in the head of the generic header. Information regarding the type of data arranged in the payload of the generic packet is set in this type information.

When the time information and other signaling information for signaling are arranged in the payload of the generic packet, for example, "100" is set in the type information of the generic header. In the generic header, a subsequent portion of the type information in which "100" is set is considered as a 1-bit reserved region (Res: Reserved) and a 1-bit header mode (HM: HeaderMode) is subsequently arranged.

When "0" is set as the header mode, 11-bit length information (Length (LSB)) is arranged continuously to follow the header mode. This length information is set with the length of the payload of the generic packet. In contrast, when "1" set as the header mode, total 16-bit length information of the 11-bit length information (Length (LSB)) and 5-bit length information (Length (MSB)) is arranged continuously to follow the header mode and a 3-bit reserved region (Res) is further provided.

When "0" is set as the header mode, the length information (Length (LSB)) has 11 bits. The 11-bit length information can represent a value of a range of 0 to 2047 ($=2^{11}-1$) bytes as the length of the payload of the generic packet. However, the 11-bit length information may not represent the length of the payload equal to or greater than 2048 bytes. Accordingly, when data equal to or greater than 2048 bytes is arranged in the payload, "1" is set as the header mode. In this case, 1 byte (8 bits) is added as the region of the generic header, and thus the length information has 16 bits. The 16-bit length information can represent the length of the payload equal to or greater than 2048 bytes.

In the generic packet, the payload is arranged after the generic header having the above-described configuration. Here, since "100" is set as the type information of the generic header, signaling information including the time information is arranged in the payload.

FIG. 7 is a diagram for describing type information of the generic packet in FIG. 6.

When the IP packet of IPv4 is arranged in the payload of the generic packet, "000" is set in the type information. When the compressed IP packet is arranged in the payload, "001" is set in the type information. Further, when the TS packet of the MPEG2-TS scheme is arranged in the payload, "010" is set in the type information.

When the signaling information such as the time information is arranged in the payload, "100" is set in the type information. In FIG. 7, ternary type information of "011," "101," and "110" is undefined (Reserved). When extension of the type information is insufficient in the ternary undefined (Reserved), the type information (a region of the type information) can be further extended by setting "111" in the type information.

<Second Arrangement Example when Time Information is Arranged in Payload>

FIG. 8 is a diagram for describing a second arrangement example when the time information is arranged in the head of the payload of the physical layer frame.

In the second arrangement example, the time information is arranged in the header of the generic packet in the head of the BB frame of the head of the payload of the physical layer frame as the head of the payload of the physical layer frame.

FIG. 8 illustrates a configuration example of the generic packet.

As described with reference to FIG. 6, in the generic packet, type information regarding the type of data arranged in the payload of the generic packet is set in 3-bit type information (Type) of the head of the generic header.

In the second arrangement example, "000," "001," or "010" is set in the 3-bit type information of the generic header.

As described with reference to FIG. 7, when "000" is set as the type information, an IP packet of IPv4 is arranged in the payload. When "001" is set, a compressed IP packet is arranged in the payload. When "101" is set as the type information, a TS packet is arranged in the payload.

In the generic header, 1-bit packet setting information PC (Packet Configuration) is arranged after the type information in which "000," "001," or "010" is set. When "0" is set as the packet setting information PC, the generic header enters a normal mode. Then, according to the subsequently arranged header mode (HM), 11-bit length information (Length) or 16-bit length information and 3-bit reserved region (Res) are arranged. In the payload continuously following the generic header, an IP packet of IPv4, a compressed IP packet, or a TS packet is arranged according to the type information of the generic header.

In contrast, when "1" is set as the packet setting information PC, the generic header enters a signaling mode. Then, according to the subsequently arranged header mode (HM), the length information (Length) is arranged. That is, when "0" is set as the header mode, 11-bit length information (Length (LSB)) is arranged continuously to follow the header mode. Further, the generic header extends. Then, signaling information (Signaling) including the time information is arranged after the length information.

When "1" is set as the packet setting information PC and "1" is set as the header mode (HM), 16-bit length information (Length) and 3-bit reserved region (Res) are arranged after the header mode. Further, the generic header is extended. Then, signaling information (Signaling) including the time information is arranged after the reserved region.

The portion up to the foregoing signaling information is set as the generic header (extension header) and the payload is arranged after the generic header. In the payload, an IPv4, a compressed IP packet, or the like is arranged according to the type information of the generic header.

<Third Arrangement Example when Time Information is Arranged in Payload>

FIG. 9 is a diagram for describing a third arrangement example when the time information is arranged in the head of the payload of the physical layer frame.

In the third arrangement example, the time information is arranged in the BB header of the BB frame in the head of the payload of the physical layer frame as the head of the payload of the physical layer frame.

FIG. 9 illustrates a configuration example of the BB frame.

In FIG. 9, the BB frame is configured to include the BB header and the payload (Payload). A 1-byte or 2-byte header (Header) is arranged in the BB header. Further, a 1-byte or 2-byte optional field (Optional Field) and an extension field (Extension Field) are arranged in the BB header.

In the head of the header (Header), a 1-bit mode (MODE) is set.

When "0" is set as the 1-bit mode (MODE), only 7-bit pointer information (Pointer (LSB)) is arranged after the mode in the header. The pointer information is information that indicates the position of the generic packet arranged in the payload of the BB frame. For example, when data of the generic packet arranged in the end of a certain BB frame is arranged across a subsequent BB frame, position information of the generic packet arranged in the head of the subsequent BB frame can be set as the pointer information.

When "1" is set as the mode (MODE), 7-bit pointer information (Pointer (LSB)), 6-bit pointer information (Pointer (MSB)), and a 2-bit optional flag (OPTI: OPTIONAL) are arranged after the mode in the header. An optional field (Optional Field) and an extension field (Extension Field) are arranged in the optional flag that indicates whether the BB header extends.

When the optional field and the extension field are not extended, "00" is set in the optional flag.

When only the optional field is extended, "01" or "10" is set in the optional flag. When "01" is set as the optional flag, 1 byte (8 bits) is padded to the optional field. When "10" is set as the optional flag, 2 bytes (16 bits) are padded to the optional field.

When the optional field and the extension field are extended, "11" is set in the optional flag. In this case, 3-bit extension type information (TYPE (EXT_TYPE)) is set in the head of the optional field. In the extension type information, extension length information (EXT_Length) and information regarding the type of the extension field (Extension type) arranged after the extension type information are set.

In the third arrangement example, signaling information including the time information is arranged in the extension field (extension header).

That is, in the third arrangement example, "11" is set as the optional flag (OPTI), and thus the optional field and the extension field are extended. Further, "011" is set as the extension type information (TYPE (EXT_TYPE)) of the optional field, and thus the signaling information including the time information is arranged in the extension field.

FIG. 10 is a diagram for describing the extension type information (TYPE EXT_TYPE)) in FIG. 9.

In the extension type information, the extension length information (EXT_Length) and the information regarding the type of the extension field (Extension type) arranged after the extension type information are set.

That is, when the extension length information (EXT_Length) is arranged after the extension type information (EXT_TYPE) and only stuffing bytes (Stuffing Bytes) are arranged in the extension field (Extension Field), "000" is set in the extension type information.

When the extension length information (EXT_Length) is not arranged after the extension type information (EXT_TYPE) and an ISSY (Input Stream Synchronization) is arranged in the extension field (Extension Field), "001" is set in the extension type information.

When the extension length information (EXT_Length) is arranged after the extension type information (EXT_TYPE) and stuffing bytes are arranged along with the ISSY in the extension field (Extension Field), "010" is set in the extension type information.

When the extension length information (EXT_Length) is arranged after the extension type information (EXT_TYPE) and the signaling information including the time information is arranged in the extension field (Extension Field), "011" is set in the extension type information. In this case, whether the stuffing bytes are arranged is arbitrary. In FIG. 10, extension type information of "100" to "111" is undefined (reserved).

As described above, the time information can be arranged in the head of the payload of the physical layer frame.
<Configuration Example of Transmission Device 10>

FIG. 11 is a block diagram illustrating a configuration example of the transmission device 10 in FIG. 1.

In FIG. 11, the transmission device 10 includes a time information acquisition unit 61, a descriptor generation unit 62, a preamble generation unit 63, a component acquisition unit 64, an encoder 65, a frame generation unit 66, a transmission unit 67, and an antenna 68.

The time information acquisition unit 61 acquires the time information and supplies the time information to the descriptor generation unit 62. The time information is acquired in the following manner. That is, when a packet necessary to configure the BB frame arrives at a scheduler (not illustrated), the physical layer frame configured to include the BB frame is obtained from a time t at which the BB frame is generated by the frame generation unit 66 and a time T of the head of the second preamble Preamble of the physical layer frame is obtained. Then, the time T is supplied as a control signal from the scheduler to the time information acquisition unit 61. The time information can be used for SFN synchronization.

The descriptor generation unit 62 generates a time information descriptor including the time information from the time information acquisition unit 61 and supplies the time information descriptor to the preamble generation unit 63.

The preamble generation unit 63 generates a preamble (the first preamble BS and the second preamble Preamble) in which the time information descriptor from the descriptor generation unit 62 is included in, for example, the second preamble Preamble and supplies the preamble to the frame generation unit 66.

The component acquisition unit 64 acquires image or audio data as the component included in a service (for example, a program) and supplies the image or audio data to the encoder 65.

That is, for example, the component acquisition unit 64 acquires corresponding content according to a period of broadcast time from a storage site of the previous recorded content or acquires live content from a studio or a location site and supplies the content (data of the content) to the encoder 65.

The encoder 65 encodes the image or audio data supplied from the component acquisition unit 64 according to a predetermined encoding scheme and supplies the encoded data to the frame generation unit 66 in, for example, an IP packet format.

The frame generation unit 66 generates (configures) the physical layer frame appropriately using the preamble from the preamble generation unit 63 and the IP packet from the encoder 64 and supplies the physical layer frame to the transmission unit 67.

That is, as described with reference to FIG. 2, the frame generation unit 66 configures the generic packet in which the IP packet from the encoder 65 is arranged. Further, the frame generation unit 66 configures the BB frame in which the generic packet is arranged in the payloads of the BB frame.

The frame generation unit 66 configures the FEC frame from the BB frame, performs a necessary process, and arranges the FEC frame in the payload of the physical layer frame.

Then, the frame generation unit 66 configures the physical layer frame by appending the preamble from the preamble generation unit 63 to the payload of the physical layer frame and supplies the physical layer frame to the transmission unit 67.

The transmission unit 67 performs a process such as digital modulation or up-converting on the physical layer frame from the frame generation unit 66 and transmits the physical layer frame as a digital broadcast signal via the antenna 68.

In the transmission device 10 in FIG. 11, it is not necessary to physically arrange all of the functional blocks in a single device. At least some of the functional blocks may be configured as a device physically independent from the other functional blocks.
<Transmission Process>

FIG. 12 is a flowchart for describing an example of a transmission process performed by the transmission device 10 in FIG. 11.

In step S11, the time information acquisition unit 61 acquires the time information and supplies the time information to the descriptor generation unit 62. Then, the process proceeds to step S12.

In step S12, the descriptor generation unit 62 generates the time information descriptor including the time information from the time information acquisition unit 61, as necessary, and supplies the time information descriptor to the preamble generation unit 63. Then, the process proceeds to step S13.

In step S13, the preamble generation unit 63 generates the preamble of the physical layer frame in which the time information descriptor from the descriptor generation unit 62 is included in the second preamble Preamble and supplies the preamble to the frame generation unit 66. Then, the process proceeds to step S14.

In step S14, the component acquisition unit 64 acquires the image or audio data as the component configuring the service and supplies the image or audio data to the encoder 65.

The encoder 65 performs a process such as encoding on the image or audio data supplied from the component acquisition unit 64 and supplies the image or audio data to the frame generation unit 66 in the IP packet format. Then, the process proceeds from step S14 to step S15.

In step S15, the frame generation unit 66 generates the physical layer frame appropriately using the preamble from the preamble generation unit 63 and the IP packet from the encoder 64 and supplies the physical layer frame to the transmission unit 67. Then, the process proceeds to step S16.

In step S16, the transmission unit 67 transmits the physical layer frame from the frame generation unit 66 as the digital broadcast signal via the antenna 68.
<Configuration Example of Reception Device 20>

FIG. 13 is a block diagram illustrating a configuration example of the reception device 20 in FIG. 1.

In FIG. 13, the reception device 20 is configured to include an antenna 71, a tuner 72, a demodulation unit 73, a processing unit 74, a display unit 75, and a speaker 76.

The antenna 71 receives the digital broadcast signal from the transmission device 10 and supplies the digital broadcast signal to the tuner 72.

The tuner 72 is tuned to a component of a predetermined frequency channel from the digital broadcast signal from the antenna 71 to receive the physical layer frame transmitted at the frequency channel, and supplies the physical layer frame to the demodulation unit 73.

The demodulation unit 73 performs a demodulation process on the physical layer frame supplied from the tuner 72.

That is, the demodulation unit 73 demodulates the preamble (the first preamble BS and the second preamble Preamble) of the physical layer frame and further demodulates the payload of the physical layer frame using the demodulation result of the preamble as necessary.

The demodulation unit 73 demodulates (decodes) the FEC frame obtained by demodulating the payload of the physical layer frame.

Then, the demodulation unit 73 demodulates the generic packet from the BB frame obtained as the demodulation result of the FEC frame, demodulates the IP packet from the generic packet, and supplies the IP packet to the processing unit 74.

The demodulation unit 73 acquires the time information descriptor included in the preamble of the physical layer frame in the demodulation process and supplies the time information descriptor to the processing unit 74.

The processing unit 74 decodes an image and audio of a program from the IP packet from the demodulation unit 73, supplies the image to the display unit 75, and supplies the audio to the speaker 76.

The processing unit 74 includes a time information acquisition unit 81. The time information acquisition unit 81 acquires the time information from the time information descriptor from the demodulation unit 73 as necessary. The processing unit 74 performs a necessary process using the time information acquired from the time information acquisition unit 81.

That is, the processing unit 74 (or the demodulation unit 73) performs, for example, clock data recovery using the time information and performs a synchronization process or the like for synchronization with the transmission device 10. The processing unit 74 performs a timing control process of controlling a timing of presentation of the image, the audio, and the like using the time information. In addition, for example, the time information can be applied to synchronization such as SFN synchronization of DVB-T.2.

The display unit 75 displays the image from the processing unit 74. The speaker 76 outputs the audio from the processing unit 74.

In the reception device 20 in FIG. 13, the configuration in which the display unit 75 and the speaker 76 are internally included has been described, but the display unit 75 and the speaker 76 may be provided externally.

<Reception Process>

FIG. 14 is a flowchart for describing a reception process performed by the reception device 20 in FIG. 13.

In step S21, the tuner 72 receives the physical layer frame from the digital broadcast signal from the antenna 71 and supplies the physical layer frame to the demodulation unit 73. Then, the process proceeds to step S22.

In step S22, the demodulation unit 73 performs the demodulation process on the physical layer frame supplied from the tuner 72 and supplies the IP packet or the time information descriptor obtained as the result to the processing unit 74. Then, the process proceeds to step S23.

In step S23, the time information acquisition unit 81 of the processing unit 74 acquires the time information from the time information descriptor from the demodulation unit 73. Then, the process proceeds to step S24. Here, the processing unit 74 performs a synchronization process or the like for synchronization with the transmission device 10 using the time information acquired by the time information acquisition unit 81.

In step S24, the processing unit 74 processes the component included in the IP packet from the demodulation unit 73 in the state of the synchronization with the transmission device 10. That is, the processing unit 74 decodes the image and the audio of the program from the IP packet from the demodulation unit 73, supplies the image to the display unit 75 to display the image, and supplies the audio to the speaker 76 to output the audio.

As described above, in the transfer system in FIG. 1, the transmission device 10 includes the time information (the time information descriptor including the time information) in the preamble of the physical layer frame to transmit the time information. Therefore, the time information can be efficiently transferred.

Further, in the transfer system in FIG. 1, the reception device 20 performs the process using the time information (which is included in the time information descriptor) included in the preamble of the physical layer frame. Therefore, the process can be performed quickly.

<PTP>

FIG. 15 is a diagram for describing time information which can be used as the time information and is defined in the PTP (hereinafter simply referred to as PTP).

The PTP is defined in IEEE1588 and is configured to have 80 bits.

The 80-bit PTP is configured to include a 48-bit second field (secondsField) representing a time in units of seconds and a 32-bit nanosecond field (nanosecondsField) representing a time in units of nanoseconds.

In the second field, 1 represents 1 second. In the nanosecond field, 1 represents 1 nanosecond.

Accordingly, for example, in the PTP representing+ 2.000000001 seconds, the second field has 0x000000000002 and the nanosecond field has 0x00000001. Further, 0x represents that subsequently continuous values are hexadecimal numbers.

Here, since $10^9$ nanoseconds are 1 second, the nanosecond field takes values from 0 to a value less than $10^9$.

That is, the maximum value of the nanosecond field is $10^9-1$. Since $10^9-1$ can be expressed in 30 bits, the 2 high-order bits of the 32-bit nanosecond field are normally 0.

In IEEE 1588, 0:00 on 1 Jan. 1970 in International Atomic Time (TAI) is defined as an epoch which is a starting point of a time represented by the PTP. That is, the PTP of IEEE1588 represents a time at which 0:00 on 1 Jan. 1970 of TAI is assumed to be the epoch.

As described with reference to FIG. 4, when the PTP is adopted as the time information included in the physical layer frame, the accurate time information can be transferred and the accurate time can be reproduced in the reception device 10. Thus, it is possible to prevent the problem of the leap second from occurring.

Incidentally, a very accurate time can be expressed according to the PTP. However, when broadcast is performed with the transfer system in FIG. 1, transferring of the time information with high precision excessive for the broadcast may result in oppression of a transfer bandwidth, and thus is not efficient.

The 80-bit PTP is the time information with considerably sufficient precision in the supply of the service by broadcast. Even when an information amount of the PTP is reduced to some extent, the supply of the service by broadcast can be sufficiently maintained.

Accordingly, in the transfer system in FIG. 1, the information amount of the PTP which is the time information can be reduced to be transferred.

As a method of reducing the information amount of the PTP, for example, there is a method of reducing a transfer frequency of the PTP or a method of compressing the PTP.

Here, as described with reference to FIGS. 5 to 10, the time information can be included in the payload rather than the preamble of the physical layer frame.

However, a case in which the time information is included in the preamble of the physical layer frame will be exemplified in the following description.

<Method of Reducing Transfer Frequency PTP>

FIG. 16 is a diagram for describing an example of a method of reducing a transfer frequency of the PTP.

The PTP which is the time information can be included in all of the physical layer frames. For precision necessary for in the synchronization with the transmission device 10 in the reception device 20, it is not necessary to include the PTP in the frames (the second preamble Preamble) of all the physical layer frames in some cases.

Accordingly, the PTP are not included in all of the physical layer frames, but can be included in some of the physical layer frames. Accordingly, it is possible to reduce the transfer frequency of the PTP.

In FIG. 16, the PTP which is the time information is inserted into only the head physical layer frame (the second preamble Preamble of the physical layer frame) among the four physical layer frames at intervals of the four physical layer frames to be transferred.

In this case, the information amount of the PTP transferred from the transmission device 10 to the reception device 20 can be reduced to about ¼, and thus it is possible to efficiently transfer the PTP.

<Method of Compressing PTP>

FIG. 17 is a diagram for describing an example of a method of compressing the PTP.

According to the 48-bit second field of the PTP, considerable times of about 892 million years can be expressed. However, in broadcast, such extensive times are not necessary.

Here, for example, in the USA, the analog broadcast was switched to the first-generation digital broadcast scheme (ATSC) in 1980. Further, the first-generation digital broadcast scheme (ATSC) is expected to be switched to the second-generation digital broadcast scheme (ATSC3.0) of about 30 years from the broadcast start.

In view of this situation, when the broadcast by the transfer system in FIG. 1 is assumed to be used for, for example, about 90 years from 2016, the time information included in the physical layer frame suffices for counting times up to about 2106.

The epoch defined as the epoch of PTP in IEEE1588 (hereinafter also referred to as a standard epoch) is 1970 (0:00 on 1 January). Therefore, when times up to 2106 are counted, times of 136 years=2106-1970 may be counted.

The number of seconds in 136 years can be counted with 32 bits. When the times up to 2106 are counted with the PTP, 32 bits suffice for the second field.

When a uniquely decided epoch (hereinafter also referred to as a unique epoch) is adopted as the epoch of the PTP rather than the standard epoch, a small number of bits can be further adopted as the second field.

That is, for example, when seconds are counted with 31 bits, the number of seconds of about 68 years can be counted. Now, for example, when 2016 is assumed to be used as a unique epoch and 31 bits are adopted as the second field, times up to 2084=2016+68 can be counted.

Accordingly, for example, when the broadcast by the transfer system in FIG. 1 is assumed to be used from 2016 to about 2080, 31 bits can be adopted as the second field by using 2016 (1 January) as the unique epoch.

Here, the foregoing description can be summarized as follows.

That is, when 32 bits are adopted as the second field, the number of seconds in about 136 years can be counted. According to the second field, when the standard epoch is adopted, times up to 2106 (=1970+136) can be counted. When 2016 is adopted as the unique epoch, times up to 2152 (=2016+136) can be counted.

When 31 bits are adopted as the second field, the number of seconds in about 68 years can be counted. According to the second field, when the standard epoch is adopted, times up to 2038 (=1970+68) can be counted. When 2016 is adopted as the unique epoch, times up to 2084 (=2016+68) can be counted.

How long a period continues has been estimated above as the period in which the broadcast is performed in the transfer system in FIG. 1. For example, about 31 bits or 32 bits are expected to suffice for the second field.

On the other hand, the nanosecond field of the PTP represents a time in units of nanoseconds. Therefore, a clock of 1 GHz (frequency of 1 GHz) can be counted maximally. However, that high-speed clock (count of the clock) is not necessary for the broadcast.

Here, according to the 32-bit nanosecond field, the clock of 1 GHz can be counted. That is, according to the 32-bit nanosecond field, values of 0x0 to 0x3b9ac9ff (=$10^9-1$) are repeatedly counted while increasing a value of $2^0$ corresponding to 1 ns (=1/(1 GHz)) in synchronization with the clock of 1 GHz.

For example, according to a 27-bit nanosecond field in which 5 low-order bits of the 32-bit nanosecond field are deleted, a clock of 32.25 MHz=1 GHz/$2^5$ can be counted. That is, according to the 27-bit nanosecond field, in 32-bit conversion, values of 0x0 to 0x3b9ac9e0 (=$10^9-2^5$) are repeatedly counted while increasing a value of $2^5$ corresponding to $2^5$ ns (=1/(32.25 MHz)) in synchronization with the clock of 32.25 MHz.

Further, for example, according to a 19-bit nanosecond field in which 13 low-order bits of the 32-bit nanosecond field are deleted, a clock of 122.0 kHz=1 GHz/213 can be counted. That is, according to the 19-bit nanosecond field, in 32-bit conversion, values of 0x0 to 0x3b9aa000 (=$10^9-2^{13}$) are repeatedly counted while increasing a value of $2^{13}$ corresponding to $2^{13}$ ns (=1/(122.0 kHz)) in synchronization with the clock of 122.0 kHz.

In the broadcast, a clock of about 90 kHz or about 27 MHz is generally adopted.

According to the 27-bit nanosecond field in which the clock of 32.25 MHz can be counted, precision of a clock of 27 MHz can be ensured. According to the 19-bit nanosecond field in which the clock of 122.0 kHz can be counted, precision of a clock of 90 kHz can be ensured.

Accordingly, in the broadcast in which the clock of about 90 kHz or about 27 MHz is adopted, for example, the 5 or 13 low-order bits are deleted in the nanosecond field. Thus, sufficient precision can be ensured even with 27 bits or 19 bits.

As described with reference to FIG. 15, since the 2 high-order bits of the nanosecond field are normally 0, the 27-bit or 19-bit nanosecond field in which the 5 low-order bits or 13 low-order bits are deleted can be set as a 25-bit or 17-bit nanosecond field in which the 2 high-order bits are further deleted.

FIG. 17 illustrates an example of compression of PTP when the second field is compressed into 32 bits and the nanosecond field is compressed into 19 bits.

In the transmission device 10 (see FIG. 11), the 80-bit PTP configured to include the 48-bit second field and the 32-bit nanosecond field is supplied from the time information acquisition unit 61 to the descriptor generation unit 62.

The descriptor generation unit 62 compresses the 48-bit second field to a 32-bit second field (hereinafter also referred to as a compressed second field), for example, by deleting the 16 high-order bits in the 48-bit second field.

Further, the descriptor generation unit 62 compresses the 32-bit nanosecond field to a 19-bit nanosecond field (hereinafter also referred to as a compressed nanosecond field), for example, by deleting the 13 low-order bits in the 32-bit nanosecond field.

The descriptor generation unit 62 includes a 51-bit PTP (hereinafter also referred to as a compressed PTP) compressed with the 32-bit compressed second field and the 19-bit compressed nanosecond field in the time information descriptor to supply the compressed PTP to the preamble generation unit 63 (see FIG. 11).

In this way, in the method of compressing the PTP, some of the bits in each of the second field and the nanosecond field of the PTP are deleted, so that the PTP is compressed into a compressed PTP (compressed time information) with a so-called intermediate format to be transferred.

In the reception device 20 (see FIG. 13), the time information acquisition unit 81 acquires the compressed PTP included in the time information descriptor and restores the compressed PTP to the PTP with the format defined in IEEE1588.

That is, the time information acquisition unit 81 restores the 32-bit compressed second field to the 48-bit second field by appending (adding) 16 bits of zeros bits as the high-order bits of the 32-bit compressed second field of the compressed PTP.

Further, the time information acquisition unit 81 restores the 19-bit compressed nanosecond field to the 32-bit nanosecond field by appending 0 of 13 bits as the low-order bits of the 19-bit compressed nanosecond field of the compressed PTP.

The time information acquisition unit 81 restores the PTP with the format defined in IEEE1588 configured to include the 48-bit second field and the 32-bit nanosecond field.

The descriptor generation unit 62 can compress the 32-bit nanosecond field to the 17-bit compressed nanosecond field by deleting the 13 low-order bits of the 32-bit nanosecond field and deleting the 2 high-order bits which are normally 0, as described above.

In this case, the time information acquisition unit 81 restores the 17-bit compressed nanosecond field to the 32-bit nanosecond field by appending 0 of 13 bits as the low-order bits of the 17-bit compressed nanosecond field and appending 0 of 2 bits as the high-order bits.

When the unique epoch is adopted as the epoch of the PTP rather than the standard epoch, the descriptor generation unit 62 subtracts a time corresponding to a difference (hereinafter also referred to as a difference time) between the standard epoch and the unique epoch (unique epoch-standard epoch) from the PTP, and then compresses the PTP after the subtraction to the compressed PTP.

Further, in this case, the time information acquisition unit 81 restores the compressed second field and the compressed nanosecond field to the second field and the nanosecond field, and subsequently adds the difference time to the restored second field and nanosecond field to restore the PTP with the format defined in IEEE1588 (the PTP of the standard epoch).

<Compression Mode>

FIG. 18 is a diagram illustrating an example of a compression mode in which the PTP is compressed.

In FIG. 18, the compression mode is expressed with 4 bits, and 16 kinds of compression modes from mode 0 to mode 15 can be defined.

In FIG. 18, mode 3 and mode 7 to mode 15 are undefined (Reserved). In practice, 6 kinds of compression modes are defined.

In mode 0, the PTP is not compressed and is configured to include the 48-bit second field and the 32-bit nanosecond field is used as the PTP. In mode 0, the standard epoch is used as the epoch of the PTP.

In mode 1, the 48-bit second field is compressed into the 32-bit second field by deleting the 16 high-order bits and the 32-bit nanosecond field is compressed into the 19-bit nanosecond field by deleting the 13 low-order bits. In mode 1, the standard epoch is used as the epoch of the PTP.

In mode 2, the 48-bit second field is compressed into the 32-bit second field by deleting the 16 high-order bits and the 32-bit nanosecond field is compressed into the 27-bit nanosecond field by deleting the 5 low-order bits. In mode 2, the standard epoch is used as the epoch of the PTP.

In mode 4, the PTP is not compressed and the PTP configured to include the 48-bit second field and the 32-bit nanosecond field is used. In mode 4, the unique epoch is used as the epoch of the PTP.

In mode 5, the 48-bit second field is compressed into the 32-bit second field by deleting the 17 high-order bits and the 31-bit nanosecond field is compressed into the 19-bit nanosecond field by deleting the 13 low-order bits. In mode 5, the unique epoch is used as the epoch of the PTP.

In mode 6, the 48-bit second field is compressed into the 32-bit second field by deleting the 17 high-order bits and the 31-bit nanosecond field is compressed into the 27-bit nanosecond field by deleting the 5 low-order bits. In mode 6, the unique epoch is used as the epoch of the PTP.

The compression mode is decided, for example, by estimating the number of bits necessary for the broadcast in the second field and the nanosecond field on the side of the transmission device 10.

As described with reference to FIG. 17, in addition to the low-order bits, the 2 high-order bits are deleted, so that the nanosecond field can be compressed.

The compression mode in which the low-order bits and the 2 high-order bits of the nanosecond field are deleted can be allocated to one of the undefined modes in FIG. 18.

<Syntax of Time Information Descriptor>

FIG. 19 is a diagram illustrating a first example of the syntax of a time information descriptor.

In FIG. 19, time_info_flag is a time information flag that indicates presence or absence of the PTP (compressed PTP) which is the time information. A value 0 indicates that the PTP is present and a value 1 indicates that the PTP is not present.

In the embodiment, a 1-bit flag is used as time_info_flag, but 2 bits or more can be allocated to time_info_flag.

When time_info_flag is 0, the PTP is not included in the time information descriptor. When time_info_flag is 1, the PTP is included in the time information descriptor.

For example, as illustrated in FIG. 16, when the PTP is inserted into only the head physical layer frame among the four physical layer frames at intervals of the four physical layer frames, 1 is set to time_info_flag of the time information descriptor included in the head physical layer frame and 0 is set in time_info_flag of the time information descriptor included in the 3 remaining physical layer frames.

In FIG. 19, PTP_secondsField represents the second field of the PTP and PTP_nanosecondsField represents the nanosecond field of the PTP.

In FIG. 19, the compressed PTP in which the compression mode (see FIG. 18) is mode 1 is adopted. Therefore, PTP_secondsField has 32 bits and PTP_nanosecondsField has 19 bits.

The syntax in FIG. 19 is used when the compression mode is fixed to a predetermined mode such as mode 1.

The compression mode can be fixed to a mode other than mode 1. A mode to which the compression mode is fixed can be defined by, for example, a broadcast standard.

FIG. 20 is a diagram illustrating a second example of the syntax of the time information descriptor.

In FIG. 20, time_info_flag is the time information flag described with reference to FIG. 19.

In FIG. 20, when time_info_flag is 0, the compression mode and the PTP are not included in the time information descriptor. When time_info_flag is 1, the compression mode and the PTP are included in the time information descriptor.

In FIG. 20, mode represents the compression mode.

When mode is 0 or 4, the PTP configured to include the 48-bit second field (PTP_secondsField) and the 32-bit nanosecond field (PTP_nanosecondsField) is included in the time information descriptor, as described with reference to FIG. 18.

When mode is 1, the PTP configured to include the 32-bit compressed second field (PTP_secondsField) and the 19-bit compressed nanosecond field (PTP_nanosecondsField) is included in the time information descriptor, as described with reference to FIG. 18.

When mode is 2, the PTP configured to include the 32-bit compressed second field (PTP_secondsField) and the 27-bit compressed nanosecond field (PTP_nanosecondsField) is included in the time information descriptor, as described with reference to FIG. 18.

When mode is 5, the PTP configured to include the 31-bit compressed second field (PTP_secondsField) and the 19-bit compressed nanosecond field (PTP_nanosecondsField) is included in the time information descriptor, as described with reference to FIG. 18.

When mode is 6, the PTP configured to include the 31-bit compressed second field (PTP_secondsField) and the 27-bit compressed nanosecond field (PTP_nanosecondsField) is included in the time information descriptor, as described with reference to FIG. 18.

The syntax in FIG. 20 is used when the compression mode can be selected, as necessary.

The time information descriptors in FIGS. 19 and 20 can be configured not to include time_info_flag which is the time information flag.

When time_info_flag is not included in the time information descriptor, the (compressed) PTP which is the time information is transferred with all of the physical layer frames.

Here, as described above, the method of reducing the transfer frequency of the PTP or the method of compressing the PTP can be applied not only to the PTP which is the time information but also to any time information such as time information defined in the NTP, time information defined in 3GPP, the time information included in GPS information, and time information with a uniquely decided format.

As described above, the IP packet is transferred in the transfer system in FIG. 1. However, for example, a TS packet other than the IP packet can be transferred.

The transfer system in FIG. 1 can be applied to, for example, any data transfer of ATSC 3.0, DVB, or ISDB.

<Physical Layer Frame of DVB-T.2>

FIG. 21 is a diagram illustrating the configuration of a T2 frame (T2frame) which is a physical layer frame of DVB-T.2.

The T2 frame includes P1 and P2 serving as a preamble and a data symbol (Data Symbols) serving as a payload.

P1 includes P1 signaling, and P2 includes L1-pre signaling and L1-post signaling.

L1-post signaling includes Configurable, Dynamic, Extension, CRC, and L1 padding.

The time information descriptor can be included in the preamble (for example, P2 of the preamble) of the T2 frame described above.

<Description of Computer to which the Present Technology is Applied>

Next, the series of processes of the transmission device 10 or the reception device 20 can be performed by hardware or may also be performed by software. When the series of processes is performed by software, a program configuring the software is installed in a computer.

Thus, FIG. 22 is a block diagram illustrating a configuration example of an embodiment of a computer in which a program executing the above-described series of processes is installed.

The program can be recorded in advance in a ROM 103 or a hard disk 105 serving as a recording medium internally included in the computer.

Alternatively, the program can be stored (recorded) in a removable recording medium 111. The removable recording medium 111 can be provided as so-called package software. Here, examples of the removable recording medium 111 include a flexible disk, a compact disc read-only memory (CD-ROM) disc, a magneto-optical (MO) disc, a digital versatile disc (DVD), a magnetic disk, and a semiconductor memory.

The program can be installed in the computer from the above-described removable recording medium 111 and can also be downloaded to the computer via a communication network or a broadcasting network and installed in the internally included hard disk 105. That is, for example, the program can be transferred in a wireless manner from a download site to the computer via a digital satellite broadcasting artificial satellite or can be transferred in a wired manner from a download site to the computer via a network such as a local area network (LAN) or the Internet.

The computer internally includes a central processing unit (CPU) 102. An input and output interface 110 is connected to the CPU 102 via a bus 101.

When a user inputs an instruction by manipulating an input unit 107 via the input and output interface 110, the CPU 102 accordingly executes the program stored in the read-only memory (ROM) 103. Alternatively, the CPU 102 loads the program stored in the hard disk 105 to a random access memory (RAM) 104 and executes the program.

Thus, the CPU 102 performs a process according to the above-described flowchart or a process performed by the configuration of the above-described block diagram. Then, for example, the CPU 102 outputs the processing result from an output unit 106, transmits the processing unit from a communication unit 108, or records the processing result in the hard disk 105 via the input and output interface 110 as necessary.

The input unit 107 is configured to include a keyboard, a mouse, and a microphone. The output unit 106 is configured to include a liquid crystal display (LCD) or a speaker.

Processing performed herein by the computer according to a program does not necessarily have to be performed chronologically in the order described in a flow chart. That is, processing performed by the computer according to a program also includes processing performed in parallel or individually (for example, parallel processing or processing by an object).

The program may be processed by one computer (processor) or by a plurality of computers in a distributed manner. Further, the program may be performed after being transferred to a remote computer.

Further, in the present specification, a system has the meaning of a set of a plurality of configured elements (such as an apparatus or a module (part)), and does not take into account whether or not all the configured elements are in the same casing.

Therefore, the system may be either a plurality of apparatuses, stored in separate casings and connected through a network, or a plurality of modules within a single casing.

An embodiment of the disclosure is not limited to the embodiments described above, and various changes and modifications may be made without departing from the scope of the disclosure.

For example, the present technology can adopt a configuration of cloud computing which processes by allocating and connecting one function by a plurality of apparatuses through a network.

Further, each step described by the above mentioned flow charts can be executed by one apparatus or by allocating a plurality of apparatuses.

In addition, in the case where a plurality of processes is included in one step, the plurality of processes included in this one step can be executed by one apparatus or by allocating a plurality of apparatuses.

In addition, the effects described in the present specification are not limiting but are merely examples, and there may be additional effects.

Additionally, the present technology may also be configured as below.

(1)

A transmission device including:

circuitry configured to generate a physical layer frame, a time information descriptor is included in a preamble of the physical layer frame, the time information descriptor including a time information flag that indicates presence or absence of time information in the time information descriptor; and transmit the physical layer frame including the preamble and a payload, wherein the time information indicates a time of a predetermined position in a stream of the physical layer frame.

(2)

The transmission device according to (1), wherein the time information included in the time information descriptor is compressed.

(3)

The transmission device according to (2), wherein at least one low-order bit of the time information is deleted to generate the compressed time information.

(4)

The transmission device according to (2) or (3), wherein at least one high-order bit of the time information, having a value of 0, is deleted to generate the compressed time information.

(5)

The transmission device according to any of (2) to (4), wherein the time information descriptor further includes a compression mode of the compressed time information.

(6)

The transmission device according to any of (1) to (5), wherein the preamble includes a first preamble and a second preamble adjacent to the first preamble, wherein the time information descriptor is included in the second preamble, and wherein the time information included in the time information descriptor indicates the time of a position of a head of the second preamble.

(7)

The transmission device according to any of (2) to (6), wherein the time information is defined in Network Time Protocol (NTP), Third Generation Partnership Project (3GPP), or Precise Time Protocol (PTP).

(8)

The transmission device according to (7), wherein, in a 48-bit second field and a 32-bit nanosecond field included in the time information defined in the PTP, at least one high-order bit of the second field in the time information is deleted and at least one low-order bit of the nanosecond field in in time information is deleted to generate the compressed time information.

(9)

The transmission device according to (8), wherein 2 high-order bits of the nanosecond field in the time information are further deleted to generate the compressed time information.

(10)

A method of a transmission device for transmitting a physical layer frame, the method including:

generating, by circuitry of the transmission device, the physical layer frame, a time information descriptor is included in a preamble of the physical layer frame, the time information descriptor including a time information flag that indicates presence or absence of time information in the time information descriptor; and transmitting, by the circuitry, the physical layer frame including the preamble and a payload, wherein the time information indicates a time of a predetermined position in a stream of the physical layer frame.

(11)

A reception device including:

circuitry configured to receive a physical layer frame, a time information descriptor is included in a preamble of the physical layer frame, the time information descriptor including a time information flag that indicates presence or absence of time information in the time information descriptor; and perform a process based on the time information when the time information is included in the time information descriptor, wherein the time information indicates a time of a predetermined position in a stream of the physical layer frame including the preamble and a payload.

(12)

The reception device according to (11), wherein the time information included in the time information descriptor is compressed.

(13)

The reception device according to (12), wherein at least one low-order bit of the time information is deleted to generate the compressed time information.

(14)
The reception device according to (12) or (13),
wherein at least one high-order bit of the time information, having a value of 0, is deleted to generate the compressed time information.

(15)
The reception device according to any of (12) to (14),
wherein the time information descriptor further includes a compression mode of the compressed time information.

(16)
The reception device according to any of (11) to (15),
wherein the preamble has a first preamble and a second preamble adjacent to the first preamble,
wherein the time information descriptor is included in the second preamble, and
wherein the time information included in the time information descriptor indicates the time of a position of a head of the second preamble.

(17)
The reception device according to any of (12) to (16),
wherein the time information is defined in Network Time Protocol (NTP), Third
Generation Partnership Project (3GPP), or Precise Time Protocol (PTP).

(18)
The reception device according to (17),
wherein, in a 48-bit second field and a 32-bit nanosecond field included in the time information defined in the PTP, at least one high-order bit of the second field is deleted and at least one low-order bit of the nanosecond field is deleted, in a manner wherein, in a 48-bit second field and a 32-bit nanosecond field included in the time information defined in the PTP, at least one high-order bit of the second field in the time information is deleted and at least one low-order bit of the nanosecond field in the time information is deleted to generate the compressed time information

(19)
The reception device according to (18),
wherein 2 high-order bits of the nanosecond field in the time information are further deleted to generate the compressed time information.

(20)
A method of a reception device for receiving a physical layer frame, the method including:
receiving, by circuitry of the reception device, the physical layer frame, a time information descriptor is included in a preamble of the physical layer frame, the time information descriptor including a time information flag that indicates presence or absence of time information in the time information descriptor; and
performing a process based on the time information when the time information is included in the time information descriptor, wherein
the time information indicates a time of a predetermined position in a stream of the physical layer frame including the preamble and a payload.

(21)
A transmission device including:
a generation unit configured to generate a physical layer frame in which a time information descriptor, which includes a time information flag which indicates presence or absence of time information indicating a time of a predetermined position in a stream of the physical layer frame having a preamble and a payload and further includes the time information when the time information flag indicates the presence of the time information, is included in the preamble; and
a transmission unit configured to transmit the physical layer frame.

(22)
The transmission device according to (21),
wherein the time information descriptor includes compressed time information in which the time information is compressed.

(23)
The transmission device according to (22),
wherein at least one low-order bit of the time information is deleted, in a manner that the time information is compressed into the compressed time information.

(24)
The transmission device according to (22) or (23),
wherein at least one high-order bit of the time information, the high-order bit having a value of 0, is deleted, in a manner that the time information is compressed into the compressed time information.

(25)
The transmission device according to any of (22) to (24),
wherein the time information descriptor further includes a compression mode of the time information.

(26)
The transmission device according to any of (21) to (25),
wherein the preamble has a first preamble and a second preamble continuously following the first preamble,
wherein the time information descriptor is included in the second preamble, and
wherein the time information included in the time information descriptor indicates a time of a position of a head of the second preamble.

(27)
The transmission device according to any of (22) to (26),
wherein the time information is time information defined in Network Time Protocol (NTP), time information defined in Third Generation Partnership Project (3GPP), or time information defined in Precise Time Protocol (PTP).

(28)
The transmission device according to (27),
wherein, in a 48-bit second field and a 32-bit nanosecond field included in the time information defined in the PTP, at least one high-order bit of the second field is deleted and at least one low-order bit of the nanosecond field is deleted, in a manner that the time information is compressed into the compressed time information.

(29)
The transmission device according to (28),
wherein 2 high-order bits of the nanosecond field are further deleted, in a manner that the time information is compressed into the compressed time information.

(30)
A transmission method including:
generating a physical layer frame in which a time information descriptor, which includes a time information flag which indicates presence or absence of time information indicating a time of a predetermined position in a stream of the physical layer frame having a preamble and a payload and further includes the time information when the time information flag indicates the presence of the time information, is included in the preamble; and
transmitting the physical layer frame.

(31)
A reception device including:
a reception unit configured to receive a physical layer frame in which a time information descriptor, which includes a time information flag which indicates presence or absence of time information indicating a time of a predetermined position in a stream of the physical layer frame having a preamble and a payload and further includes the time information when the time information flag indicates the presence of the time information, is included in the preamble; and a processing unit configured to perform a process using the time information included in the time information descriptor included in the preamble of the physical layer frame.

(32)

The reception device according to (31), wherein the time information descriptor includes compressed time information in which the time information is compressed.

(33)

The reception device according to (32), wherein at least one low-order bit of the time information is deleted, in a manner that the time information is compressed into the compressed time information.

(34)

The reception device according to (32) or (33), wherein at least one high-order bit of the time information, the high-order bit having a value of 0, is deleted, in a manner that the time information is compressed into the compressed time information.

(35)

The reception device according to any of (32) to (34), wherein the time information descriptor further includes a compression mode of the time information.

(36)

The reception device according to any of (31) to (35), wherein the preamble has a first preamble and a second preamble continuously following the first preamble, wherein the time information descriptor is included in the second preamble, and wherein the time information included in the time information descriptor indicates a time of a position of a head of the second preamble.

(37)

The reception device according to any of (32) to (36), wherein the time information is time information defined in Network Time Protocol (NTP), time information defined in Third Generation Partnership Project (3GPP), or time information defined in Precise Time Protocol (PTP).

(38)

The reception device according to (37), wherein, in a 48-bit second field and a 32-bit nanosecond field included in the time information defined in the PTP, at least one high-order bit of the second field is deleted and at least one low-order bit of the nanosecond field is deleted, in a manner that the time information is compressed into the compressed time information.

(39)

The reception device according to (38), wherein 2 high-order bits of the nanosecond field is further deleted, in a manner that the time information is compressed into the compressed time information.

(40)

A reception method including:

receiving a physical layer frame in which a time information descriptor, which includes a time information flag which indicates presence or absence of time information indicating a time of a predetermined position in a stream of the physical layer frame having a preamble and a payload and further includes the time information when the time information flag indicates the presence of the time information, is included in the preamble; and performing a process using the time information included in the time information descriptor included in the preamble of the physical layer frame.

It should be understood by those skilled in the art that various modifications, combinations, sub-combinations and alterations may occur depending on design requirements and other factors insofar as they are within the scope of the appended claims or the equivalents thereof.

REFERENCE SIGNS LIST 10 transmission device
20 reception device
30 transfer path
61 time information acquisition unit
62 descriptor generation unit
63 preamble generation unit
64 component acquisition unit
65 encoder
66 frame generation unit
67 transmission unit
68, 71 antenna
72 tuner
73 demodulation unit
74 processing unit
75 display unit
76 speaker
81 time information acquisition unit
101 bus
102 CPU
103 ROM
104 RAM
105 hard disk
106 output unit
107 input unit
108 communication unit
109 drive
110 input and output interface
111 removable recording medium

The invention claimed is:

1. A reception device comprising:
a processor configured to:
receive a physical layer frame including a bootstrap, a preamble, and a payload, wherein
the preamble includes a time information flag that indicates presence or absence of time information in the physical layer frame,
in a case where the time information flag indicates the presence of the time information, the time information indicates a time at a head of the bootstrap, which is adjacent to the preamble, and
the time information is defined in accordance with a precise time protocol.

2. The reception device according to claim 1, wherein two bits are allocated to the time information flag.

3. The reception device according to claim 1, wherein, in a case where the time information is present, the preamble includes information representative of a precision of the time information.

4. The reception device according to claim 1, wherein, in a case where the time information is present, a precision of the time information is a nanosecond or less than the nanosecond.

5. The reception device according to claim 1, wherein, in a case where the time information is present, the time information includes a 32-bit second field.

6. The reception device according to claim 1, wherein
the processor is configured to process the time information and to control a timing of presentation of an image and audio,
the reception device includes a display and a speaker, and
the image is supplied to the display and the audio is supplied to the speaker in accordance with the time information.

7. The reception device according to claim 1, wherein the precise time protocol is defined by a standard belonging to:
IEEE1588,
3GPP, third Generation Partnership Project,
NTP, Network Time Protocol, or
GPS, Global Positioning System.

8. The reception device according to claim 5, wherein the 32-bit second field includes 32 least significant bits of a number of seconds elapsed between the time at the head of the bootstrap and a second time.

9. The reception device according to claim 7, wherein the processor is configured to restore a time relative to a Precision Time Protocol epoch using the 32-bit second field.

10. A reception method of a reception device, the method comprising:
receiving, by a processor of the reception device, a physical layer frame including a bootstrap, a preamble, and a payload, wherein
the preamble includes a time information flag that indicates presence or absence of time information in the physical layer frame,
in a case where the time information flag indicates the presence of the time information, the time information indicates a time at a head of the bootstrap, which is adjacent to the preamble, and
the time information is defined in accordance with a precise time protocol.

11. The reception method according to claim 10, wherein two bits are allocated to the time information flag.

12. The reception method according to claim 10, wherein, in a case where the time information is present, the preamble includes information representative of a precision of the time information.

13. The reception method according to claim 10, wherein, in a case where the time information is present, a precision of the time information is a nanosecond or less than the nanosecond.

14. The reception method according to claim 10, wherein, in a case where the time information is present, the time information includes a 32-bit second field.

15. The reception method according to claim 10, further comprising
processing the time information;
controlling a timing of presentation of an image and audio; and
displaying the image on a display and outputting the audio on a speaker in accordance with the time information.

16. The reception method according to claim 10, wherein the precise time protocol is defined by a standard belonging to:
IEEE1588,
3GPP, third Generation Partnership Project,
NTP, Network Time Protocol, or
GPS, Global Positioning System.

17. The reception method according to claim 14, wherein the 32-bit second field includes 32 least significant bits of a number of seconds elapsed between the time at the head of the bootstrap and a second time.

18. The reception method according to claim 17, further comprising restoring a time relative to a Precision Time Protocol epoch using the 32-bit second field.

19. A reception device comprising:
a tuner configured to receive a physical layer frame including a bootstrap, a preamble, and a payload, wherein
the preamble includes a time information flag that indicates presence or absence of time information in the physical layer frame,
in a case where the time information flag indicates the presence of the time information, the time information indicates a time at a head of the bootstrap, which is adjacent to the preamble, and
the time information is defined in accordance with a precise time protocol.

20. The reception device according to claim 19, further comprising:
a processing unit configured to process the time information and to control a timing of presentation of an image and audio;
a display; and
a speaker,
wherein the image is supplied to the display and the audio is supplied to the speaker in accordance with the time information.

21. The reception device according to claim 19, wherein the physical layer frame is an ATSC 3.0 physical layer frame.

22. The reception device according to claim 19, wherein the precise time protocol is defined by a standard belonging to:
IEEE1588,
3GPP, third Generation Partnership Project,
NTP, Network Time Protocol, or
GPS, Global Positioning System.

* * * * *